(12) United States Patent
Mishra et al.

(10) Patent No.: US 11,538,047 B2
(45) Date of Patent: Dec. 27, 2022

(54) UTILIZING A MACHINE LEARNING MODEL TO DETERMINE ATTRIBUTION FOR COMMUNICATION CHANNELS

(71) Applicant: Accenture Global Solutions Limited, Dublin (IE)

(72) Inventors: Mayank Mishra, Gurgaon (IN); Namita Sahu, Mumbai (IN); Hemant Kumar Sharma, Delhi (IN); Suchit Malhotra, Gurugram (IN)

(73) Assignee: Accenture Global Solutions Limited, Dublin (IE)

( * ) Notice: Subject to any disclaimer, the term of this patent is extended or adjusted under 35 U.S.C. 154(b) by 356 days.

(21) Appl. No.: 16/721,364

(22) Filed: Dec. 19, 2019

(65) Prior Publication Data
US 2021/0192544 A1   Jun. 24, 2021

(51) Int. Cl.
*G06Q 30/02* (2012.01)
*G06N 7/00* (2006.01)
*G06Q 10/06* (2012.01)

(52) U.S. Cl.
CPC ......... *G06Q 30/0201* (2013.01); *G06N 7/005* (2013.01); *G06Q 10/06312* (2013.01); *G06Q 30/0242* (2013.01)

(58) Field of Classification Search
CPC ......... G06Q 30/0201; G06Q 10/06312; G06Q 30/0242; G06Q 30/0202; G06Q 30/0203; G06Q 30/0204; G06N 7/005
See application file for complete search history.

(56) References Cited

U.S. PATENT DOCUMENTS 8,175,908 B1 * 5/2012 Anderson .......... G06Q 30/0201
                                                      705/7.29
11,085,777 B2 * 8/2021 Du ..................... H04W 4/024
(Continued)

FOREIGN PATENT DOCUMENTS

CN        110020893 A  *  7/2019  ......... G06Q 30/0242

OTHER PUBLICATIONS

Malhotra, N. K., Peterson, M., & Susan, B. K. (1999). Marketing research: A state-of-the-art review and directions for the twenty-first century. Journal of the Academy of Marketing Science, 27(2), 160-183. (Year: 1999).*

*Primary Examiner* — Patricia H Munson
*Assistant Examiner* — Nicholas D Bolen
(74) *Attorney, Agent, or Firm* — Harrity & Harrity, LLP

(57) ABSTRACT

A device may receive customer data, and may identify unique communication channels associated with the customer data. The device may determine, based on the customer data, an optimal order for a Markov chain model, and may determine a model accuracy of the Markov chain model based on the optimal order. The device may transform transitions in the Markov chain model, based on the customer data, to generate transformed transitions, and may process the customer data, with a multi-level indexing model and based on the unique communication channels and the transformed transitions, to generate sparse matrices. The device may determine removal effects and steady state values for the sparse matrices, and may determine attribution weights for the unique communication channels based on the Markov chain model with the optimal order, the removal effects, and the steady state values. The device may perform actions based on the attribution weights.

20 Claims, 14 Drawing Sheets

(56) References Cited

U.S. PATENT DOCUMENTS

| | | | |
|---|---|---|---|
| 2009/0234710 A1* | 9/2009 | Belgaied Hassine | ........................ G06Q 30/0201 705/7.29 |
| 2009/0307057 A1* | 12/2009 | Azout | ................. G06Q 30/0202 705/7.29 |
| 2015/0095111 A1* | 4/2015 | Tang | .................. G06Q 30/0202 705/7.31 |
| 2015/0161652 A1* | 6/2015 | Schnabl | ............. G06Q 30/0242 705/14.41 |
| 2016/0350796 A1* | 12/2016 | Arsenault | ........... G06Q 30/0242 |
| 2018/0035142 A1* | 2/2018 | Rao | ..................... H04N 21/4667 |
| 2018/0069885 A1* | 3/2018 | Patterson | .............. G06F 21/554 |

* cited by examiner

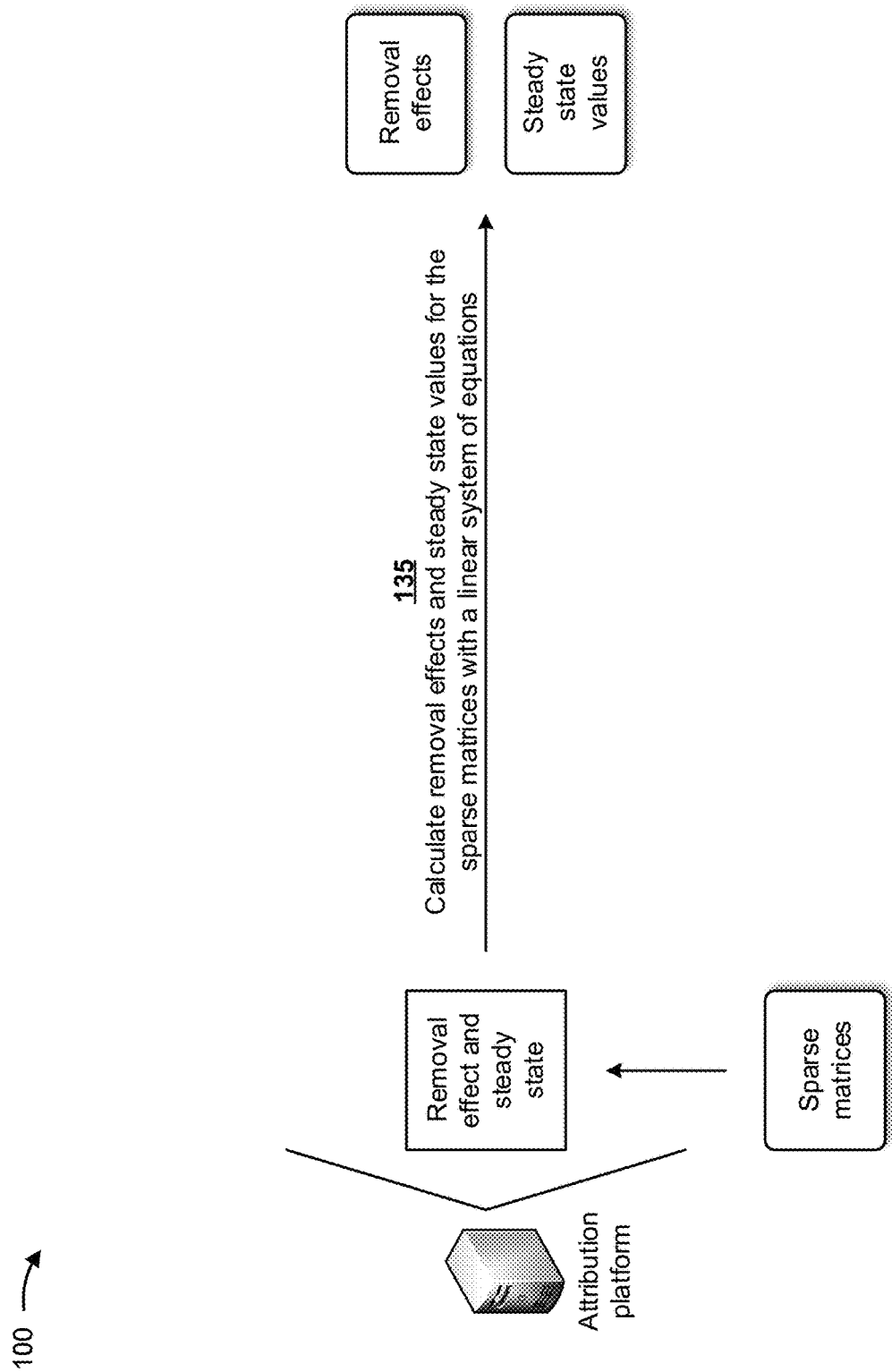

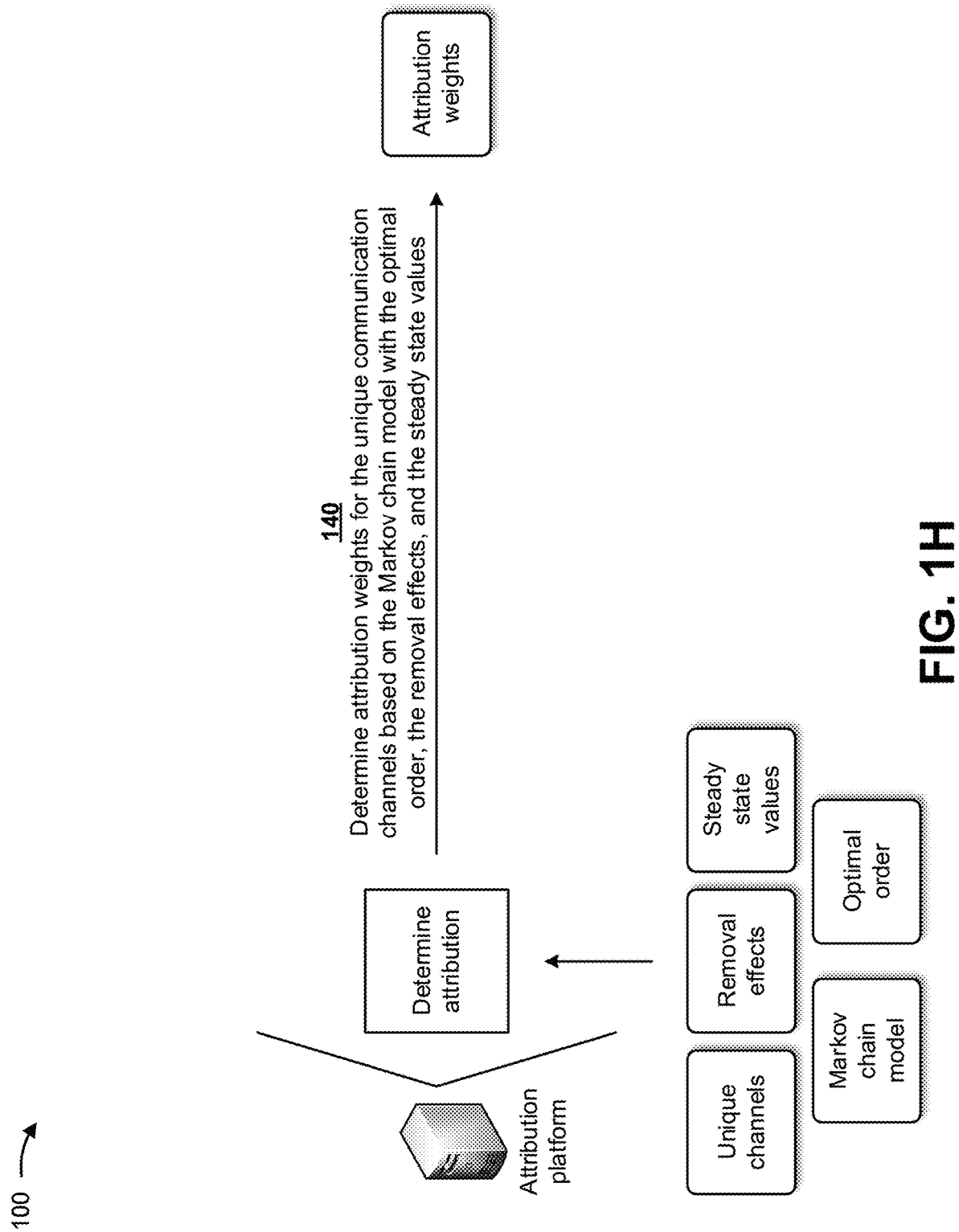

UTILIZING A MACHINE LEARNING MODEL TO DETERMINE ATTRIBUTION FOR COMMUNICATION CHANNELS

BACKGROUND

In today's digital era, a prospective customer buying journey spans over many devices and touchpoints (e.g., communication channels) before resulting in the prospective customer becoming an actual customer (e.g., a customer conversion) or a customer sale (e.g., due to a purchase of a product and/or a service). Marketers have a difficult time understanding exactly what led the customer to purchase the product and/or the service when vast information is available about the customer buying journey. In order to optimize marketing campaigns and create more customized consumer experiences, marketers need to understand which communication channels a customer utilized that resulted in a positive action (e.g., the purchase of the product and/or the service).

Attribution models based on set of rules may be utilized to determines how credit for a customer sale and/or a customer conversion is assigned to communication channels. A multitouch attribution model aims to analyze all touchpoints that contributed to the customer sale and/or the customer conversion. This enables an entity (e.g., a company, a business, and/or the like) to determine which communication channels (e.g., marketing channels, marketing campaigns, and/or the like) should be credited with the customer sale and/or the customer conversion.

SUMMARY

According to some implementations, a method may include receiving customer data identifying touchpoints of customers with an entity, and identifying unique communication channels associated with the touchpoints identified in the customer data. The method may include determining, based on the customer data, an optimal order for a Markov chain model to be utilized to determine attribution weights for the unique communication channels, and determining a model accuracy of the Markov chain model based on the optimal order. The method may include transforming transitions in the Markov chain model, based on the optimal order and the customer data, to generate transformed transitions, and processing the customer data, with a multi-level indexing model and based on the unique communication channels and the transformed transitions, to generate sparse matrices, wherein the sparse matrices include at least a portion of the customer data. The method may include utilizing a linear system of equations to calculate removal effects and steady state values for the sparse matrices, and determining attribution weights for the unique communication channels based on the Markov chain model with the optimal order, the removal effects, and the steady state values. The method may include performing one or more actions based on the attribution weights.

According to some implementations, a device may include one or more memories, and one or more processors, communicatively coupled to the one or more memories, to receive customer data identifying touchpoints of customers with an entity, and identify unique communication channels associated with the touchpoints identified in the customer data. The one or more processors may determine, based on the customer data, an optimal order for a Markov chain model to be utilized to determine attribution weights for the unique communication channels, and may determine a model accuracy of the Markov chain model based on the optimal order. The one or more processors may transform transitions in the Markov chain model, based on the optimal order and the customer data, to generate transformed transitions, and may utilize a multi-level indexing model to establish relationships between the customer data based on the unique communication channels and the transformed transitions. The one or more processors may generate sparse matrices based on the relationships between the customer data, wherein the sparse matrices include at least a portion of the customer data, and may determine removal effects and steady state values for the sparse matrices. The one or more processors may determine attribution weights for the unique communication channels based on the Markov chain model with the optimal order, the removal effects, and the steady state values, and may perform one or more actions based on the attribution weights.

According to some implementations, a non-transitory computer-readable medium may store one or more instructions that, when executed by one or more processors of a device, may cause the one or more processors to receive customer data identifying touchpoints of customers with an entity, and identify unique communication channels associated with the touchpoints identified in the customer data. The one or more instructions may cause the one or more processors to determine, based on the customer data, an optimal order for a Markov chain model to be utilized to determine attribution weights for the unique communication channels, and determine a model accuracy of the Markov chain model based on the optimal order. The one or more instructions may cause the one or more processors to transform transitions in the Markov chain model, based on the optimal order and the customer data, to generate transformed transitions, and process the customer data, with a multi-level indexing model and based on the unique communication channels and the transformed transitions, to generate sparse matrices, wherein the sparse matrices include at least a portion of the customer data. The one or more instructions may cause the one or more processors to utilize a linear system of equations to calculate removal effects and steady state values for the sparse matrices, and determine attribution weights for the unique communication channels based on the Markov chain model with the optimal order, the removal effects, and the steady state values. The one or more instructions may cause the one or more processors to perform one or more actions based on the attribution weights. The one or more actions may include providing, for display, the attribution weights determined for the unique communication channels; causing investments to be distributed for the unique communication channels based on the attribution weights; predicting investments in the unique communication channels based on the attribution weights; determining marketing plans for the customers based on the attribution weights; causing marketing plans to be implemented for the customers based on the attribution weights; or retraining the multi-level indexing model based on the attribution weights.

BRIEF DESCRIPTION OF THE DRAWINGS

FIGS. 1A-1I are diagrams of one or more example implementations described herein.

DETAILED DESCRIPTION

Figure 1A:
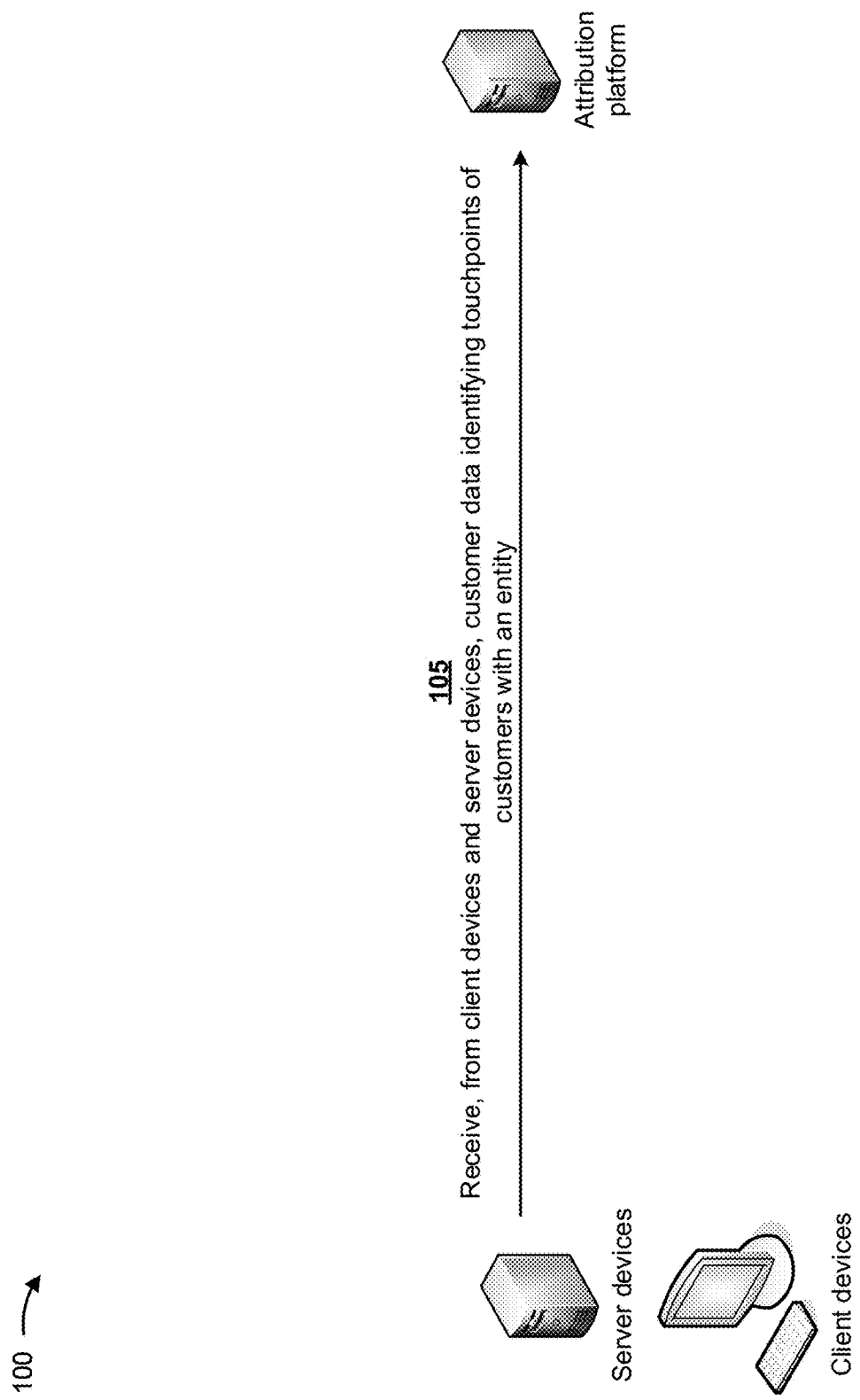

The following detailed description of example implementations refers to the accompanying drawings. The same reference numbers in different drawings may identify the same or similar elements.

It is an arduous task to track customer preferences and then evaluate the customer preferences to assign appropriate weights to all communication channels that customer utilized in the process of a customer sale and/or a customer conversion. Data-driven attribution models may consider an entire customer journey, may include comprehensive touchpoint tracking, and may adjust weighting of the models to fit user level reporting. A Markov chain model is a data-driven attribution model and may include a set of transitions determined by a probability distribution that satisfies a Markov property. The Markov chain model may determine a contribution of each communication channel to a customer sale and/or a customer conversion. An order of a Markov chain model may define a quantity of past states influencing a probability distribution of a present state. A state represents a single communication channel in a first order Markov chain model and multiple states represent multiple communication channels in a higher order Markov chain model. For a higher order Markov chain model, a longer customer journey sequence may be utilized and more previous steps may be considered when calculating a transition probability for a future step. Therefore, higher order Markov chain models may generally be more accurate in making attribution estimations.

However, utilizing high order Markov chain models is very difficult. For example, deciding which Markov order suits an attribution problem is very challenging when there are a large quantity of touchpoints and longer customer journey data points. Executing the Markov chain model for each subsequent higher order to decide best order is a tedious, time-consuming, and manual task. Furthermore, determining an accuracy of the Markov chain model is very difficult due to unbalanced data associated with customer conversion and non-conversion. The Markov chain model also requires processing and storage of large quantities of data that may exceed capacities of current computing systems. Finally, the Markov chain model requires complicated configuration of software and hardware resources to process the large quantities of data. Thus, current techniques may waste computing resources (e.g., processing resources, memory resources, communication resources, and/or the like), networking resources, and/or the like associated with selecting an order for the Markov chain model, determining an accuracy of the Markov chain model, storing data for the Markov chain model, configuring software and hardware resources for the Markov chain model, and/or like.

Some implementations described herein provide an attribution platform that utilizes a machine learning model to determine attribution for communication channels. For example, the attribution platform may receive customer data identifying touchpoints of customers with an entity, and may identify unique communication channels associated with the touchpoints identified in the customer data. The attribution platform may determine, based on the customer data, an optimal order for a Markov chain model to be utilized to determine attribution weights for the unique communication channels, and may determine a model accuracy of the Markov chain model based on the optimal order. The attribution platform may transform transitions in the Markov chain model, based on the optimal order and the customer data, to generate transformed transitions, and may process the customer data, with a multi-level indexing model and based on the unique communication channels and the transformed transitions, to generate sparse matrices, wherein the sparse matrices include at least a portion of the customer data. The attribution platform may utilize a linear system of equations to calculate removal effects and steady state values for the sparse matrices, and may determine attribution weights for the unique communication channels based on the Markov chain model with the optimal order, the removal effects, and the steady state values. The attribution platform may perform one or more actions based on the attribution weights.

In this way, the attribution platform automatically determines attribution for communication channels based on a machine learning model (e.g., a Markov chain model). The attribution platform may determine an optimal order for the Markov chain model, may calculate an accuracy of the Markov chain model, and may modify data utilized by the Markov chain model so that the data may be easily stored and processed. This, in turn, conserves computing resources, networking resources, and/or the like that would otherwise be wasted in selecting an order for the Markov chain model, determining an accuracy of the Markov chain model, storing data for the Markov chain model, configuring software and hardware resources for the Markov chain model, committing resources to incorrect communication channels, and/or like.

FIGS. 1A-1I are diagrams of one or more example implementations 100 described herein. As shown in FIG. 1A, one or more client devices may be associated with one or more server devices and an attribution platform. The client devices may include mobile devices, computers, set-top boxes, and/or the like associated with customers of an entity (e.g., a business, a financial institution, a government agency, and/or the like) that provides products and/or services. The server devices may include one or more devices associated with the entity, third party sources of information about the entity and the customers, and/or the like. The attribution platform may include a platform that utilizes a machine learning model to determine attribution for communication channels between the entity and the customers, as described herein.

As further shown in FIG. 1A, and by reference number 105, the attribution platform may receive, from the client devices and the server devices, customer data identifying touchpoints (e.g., communication channels) of the entity with the customers. In some implementations, the customer data may include data identifying marketing channels utilized by the entity with the customers, marketing campaigns utilized by the entity with the customers, communication platforms (e.g., emails, telephone calls, social media posts, postal mail, in-person, and/or the like) utilized by the entity with the customers, communication devices (e.g., mobile devices, desktop computers, set-top boxes, wearable devices, and/or the like) utilized by the customers when interacting with the entity, and/or the like.

In some implementations, the attribution platform may continuously receive the customer data, may periodically receive the customer data (e.g., in minutes, hours, days, months, and/or the like), may receive the customer data based on requests for the customer data, and/or the like. The attribution platform may store the customer data in a data structure (e.g., a database, a table, a list, and/or the like) associated with attribution platform.

Figure 1B:
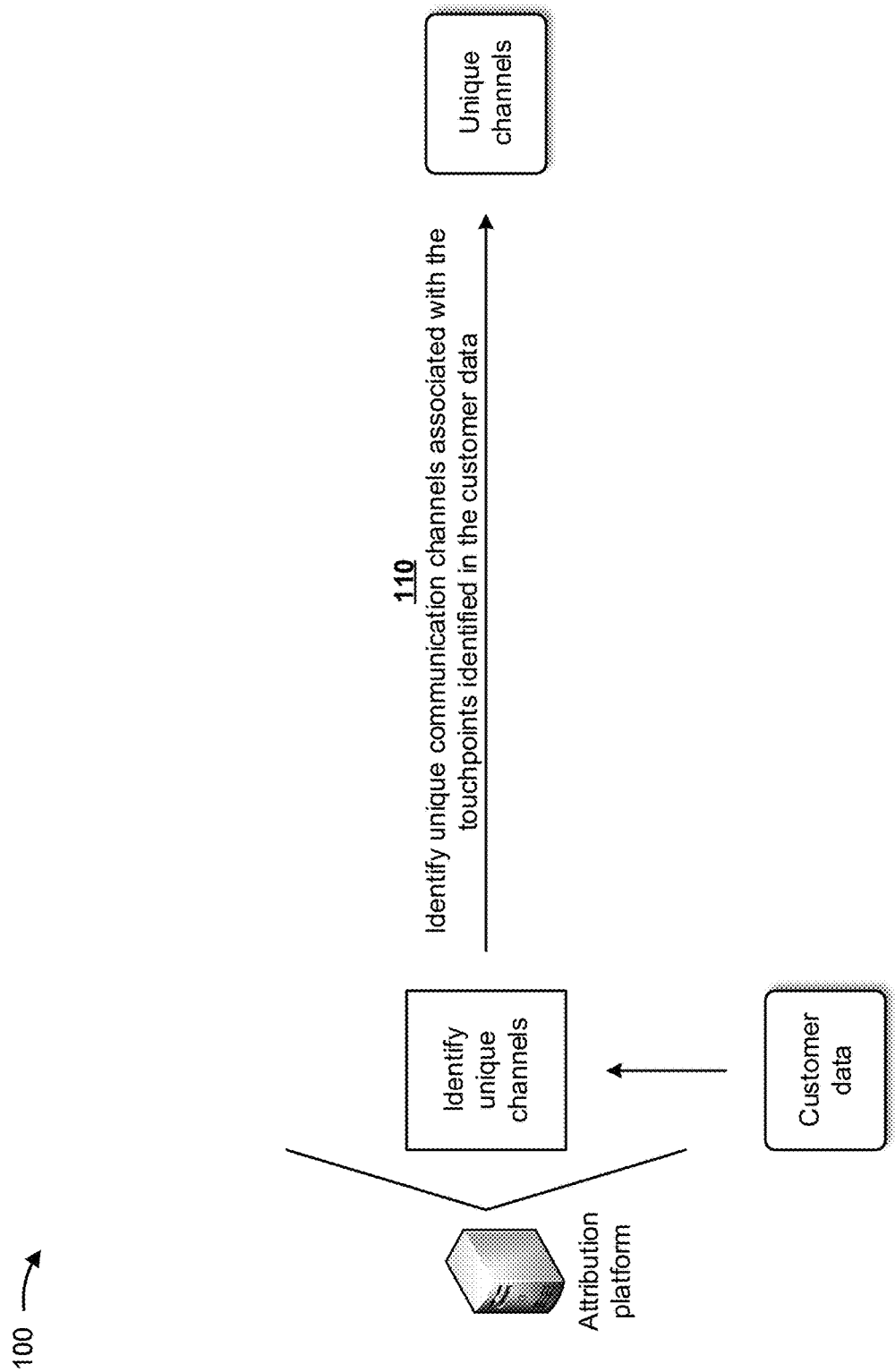

As shown in FIG. 1B, and by reference number 110, the attribution platform may identify unique communication channels associated with the touchpoints identified in the customer data. In some implementations, the attribution platform may utilize an accessibility relation to divide states (e.g., communication channels identified in the customer data) into classes. The communication channels identified in each class may be interrelated, but may be different than the communication channels identified in the remaining classes. Thus, the attribution platform may identify the communication channels in each class as a unique communication channel. In this way, the attribution platform may identify the unique communication channels associated the touchpoints identified in the customer data.

Figure 1C:
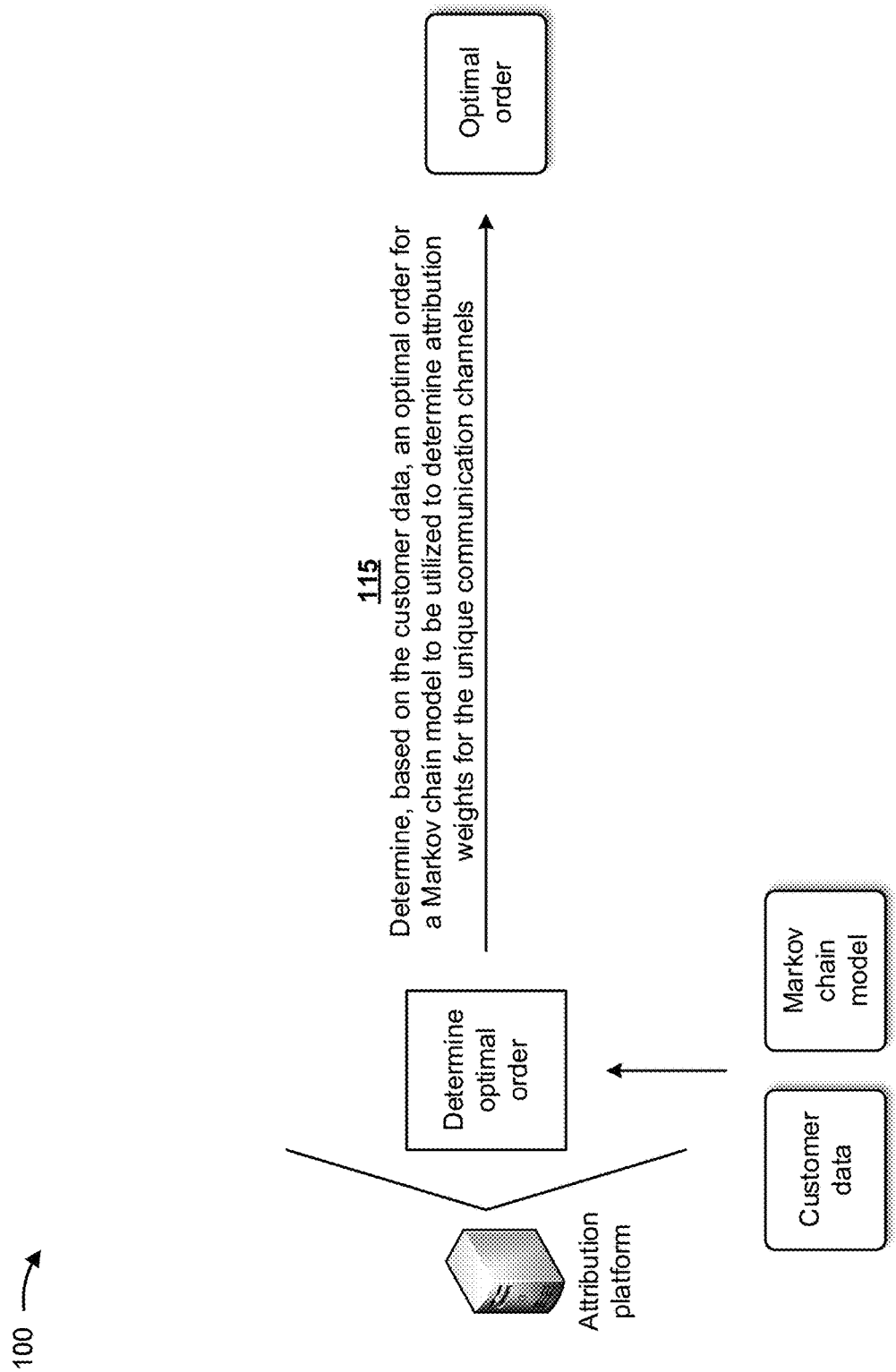

As shown in FIG. 1C, and by reference number 115, the attribution platform may determine, based on the customer data, an optimal order for a Markov chain model to be utilized to determine attribution weights for the unique communication channels. In some implementations, the attribution platform may identify the optimal order for the Markov chain model in order to capture appropriate customer engagement for precise and efficient attribution determination. Sequential execution of higher order Markov chain models may be monotonous and time consuming. In contrast, the attribution platform may provide simple and efficient execution of higher order Markov chain models by determining the optimal order of the Markov chain model based on the customer data.

In some implementations, the optimal order of the Markov chain model may enable the attribution platform to determine touchpoints that accurately represent customer behavior. Since states are not finite and data sequences of the customer data may be very long, determination of the optimal order for the Markov chain model may be challenging. In some implementations, the attribution platform may determine an optimal order for the Markov chain model based on combination of a first technique (e.g., an Akaike's information criterion (AIC)) and a second technique (e.g., a Bayesian information criterion (BIC)).

The AIC may utilize a maximum likelihood principle, may penalize Markov chains models with too many variables, and may avoid over-learning Markov chain models. The AIC may be defined as:

$$AIC(k) = {}_k\eta_m - 2*(S^m - S^k)*(S-1),$$

where ${}_k\eta_m$ may correspond to a likelihood ratio statistic for a kth order (e.g., k=0, 1, ..., m−1) and an mth order Markov chain model, S may correspond to an original number of states, and a best Markov chain model may include a weakest AIC.

Log-likelihoods of varying Markov chain orders may suggest optimal orders for the Markov chain models. A log likelihood technique may balance a goodness-of-fit against a quantity of model parameters in a Markov chain model. The log likelihood technique may compare a null Markov chain model and an alternative Markov chain model. The log likelihood technique may be based on a log likelihood ratio that defines how much more likely data is with the alternative Markov chain model than with the null Markov chain model. The likelihood ratio for a kth order (e.g., k=0, 1, ..., m−1) and an mth order Markov chain model may be calculated as follows:

$${}_k\eta_m = -2*(LL_k - LL_m),$$

where $LL_k$ may correspond to a log likelihood for the kth order, $LL_m$ may correspond to a log likelihood for the mth order, and the likelihood ratio may be utilized for calculation of the AIC and the BIC.

In some implementations, the attribution platform may determine the optimal order for the Markov chain model based on the BIC technique. The BIC may include an asymptotic result derived under assumptions that a data distribution is in an exponential family. When fitting Markov chain models, it may be possible to increase a likelihood of fit by adding parameters. However, adding parameters may result in overfitting of the Markov chain models. The BIC technique may resolve this by introducing a penalty term for a quantity of parameters in the Markov chain model. The BIC technique may provide a consistent estimate of a true order of a Markov chain model, where a lower BIC value may provide a better Markov chain model. The BIC may be defined as:

$$BIC(k) = {}_k\eta_m - (S^m - S^k)*(S-1)*ln(n),$$

$${}_k\eta_m = -2*(LL_k - LL_m),$$

where $LL_k$ may correspond to a log likelihood for the kth order, $LL_m$ may correspond to a log likelihood for the mth order, ${}_k\eta_m$ may correspond to a likelihood ratio statistics for a kth order (e.g., k=0, 1, ..., m−1) and an mth order Markov chain model, S may correspond to an original number of states, and n may correspond to a total number of states in all paths. The log likelihood may decrease with increasing Markov chain model complexity (e.g., due to more parameters), whereas penalties −2 may increase with increasing complexity. The BIC technique may apply a larger penalty when n is greater than a particular value ($n > e^2$).

In some implementations, the attribution platform may utilize a combination of the first technique (the AIC technique) and the second technique (e.g., the BIC technique) as the optimal order for the Markov chain model when the lowest AIC value for the specific order is equivalent to the same order of the lowest BIC value. The AIC predicted optimal order and the BIC predicted optimal order may be obtained by evaluating the AIC score and the BIC score for all model orders under consideration. An order that minimizes a given score of both AIC and BIC may be considered optimal.

In some implementations, the attribution platform may utilize the third optimal order determination technique (e.g., the log likelihood technique) as the optimal order when the first optimal order selection technique lowest value order (e.g., obtained from the AIC technique) is not equivalent to the order of second optimal order selection technique (e.g., obtained from the BIC technique). In the third technique, the order with highest LL value may consider as the optimal order.

Figure 1D:
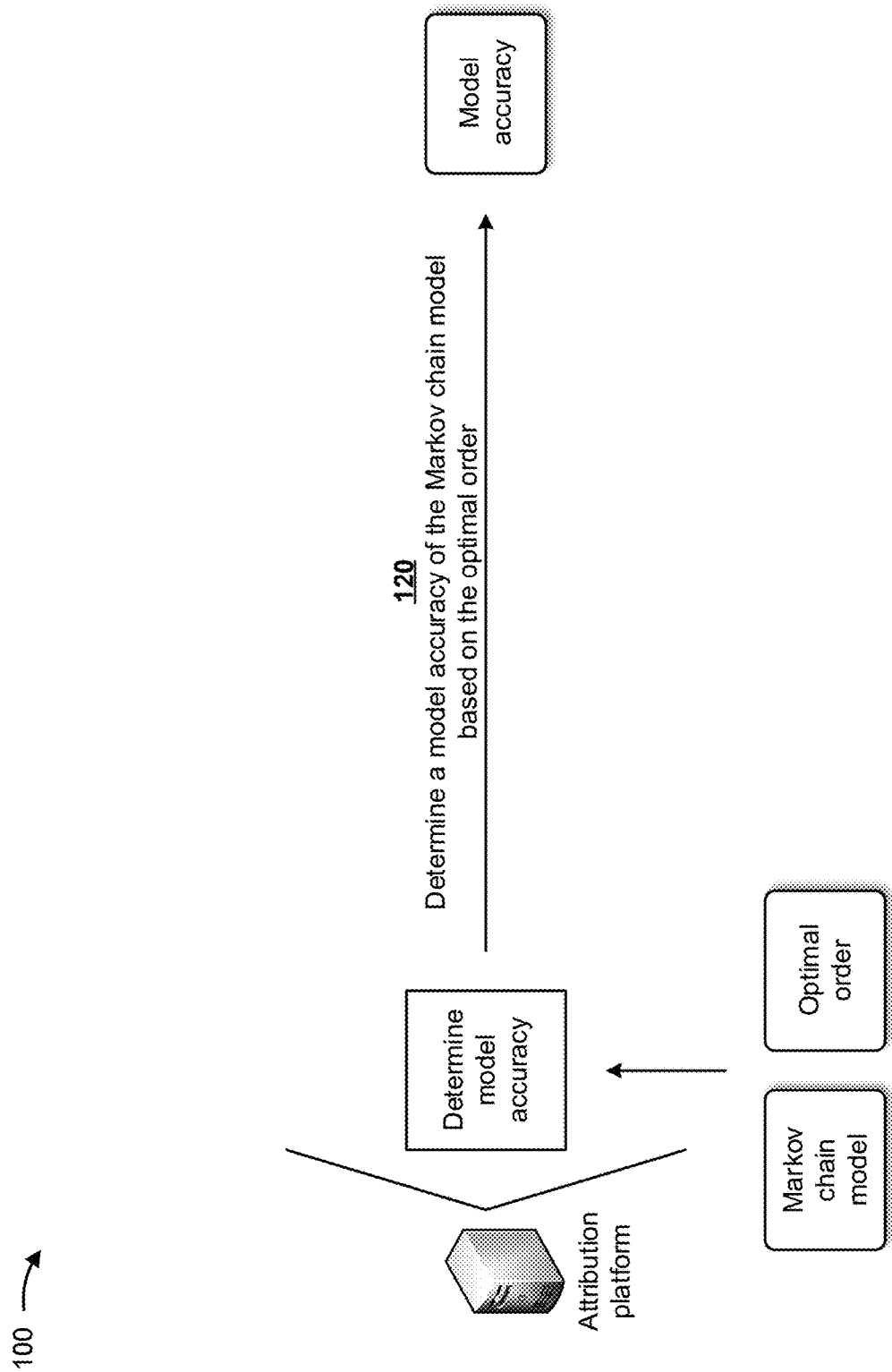

As shown in FIG. 1D, and by reference number 120, the attribution platform may determine a model accuracy of the Markov chain model based on the optimal order. Model accuracy may include a statistic used to determine how the Markov chain model performs when identifying relationships and patterns in input data (e.g., the customer data). If the Markov chain model can generalize to new input data, the Markov chain model may produce better predictions and insights and offer more value. For Markov chain models, opting for higher orders may produce more accurate results, but opting for higher orders may increase model complexity due to presence of a high variance factor.

In some implementations, the attribution platform may determine the model accuracy by classifying the Markov chain model, based on a log odds ratio, to predict customer conversion and customer non-conversion data in the customer data. The attribution platform may identify a threshold for determining a likelihood probability for conversions of the customers based on classifying the Markov chain model, and may generate a confusion matrix for model validation based on the threshold. The attribution platform may compare, based on the confusion matrix, an accuracy of the optimal order of the Markov chain model with previous and subsequent orders of the Markov chain model, and may determine the model accuracy of the Markov chain model based on comparing the accuracy of the optimal order.

To determine the model accuracy for Markov chain models of different orders (e.g., a first order, a second order, . . . , an Nth order), the attribution platform may utilize a Markov chain model classifier technique for prediction and the confusion matrix for validation of the Markov chain model. A Markov chain classification technique may include a supervised model learning model for sequential data, the attribution platform may utilize the Markov chain classification technique to predict the customer conversion and the customer non-conversion data in the customer data. A confusion matrix may include a quantity of correct and incorrect predictions made by the Markov chain classification technique compared to actual outcomes (e.g., target values) in the customer data. The attribution platform may calculate an area under the curve (AUC) value to understand an area under a receiver operating characteristic (ROC) curve and a true positive rate. A ROC curve is a graph showing a performance of a classification model with all classification thresholds set to a particular value (e.g., 0.5). The confusion matrix may include an N×N matrix, where N may correspond to a number of target values (e.g., classes). The attribution platform may evaluate performance of the Markov chains models using data in the confusion matrix.

Figure 1E:
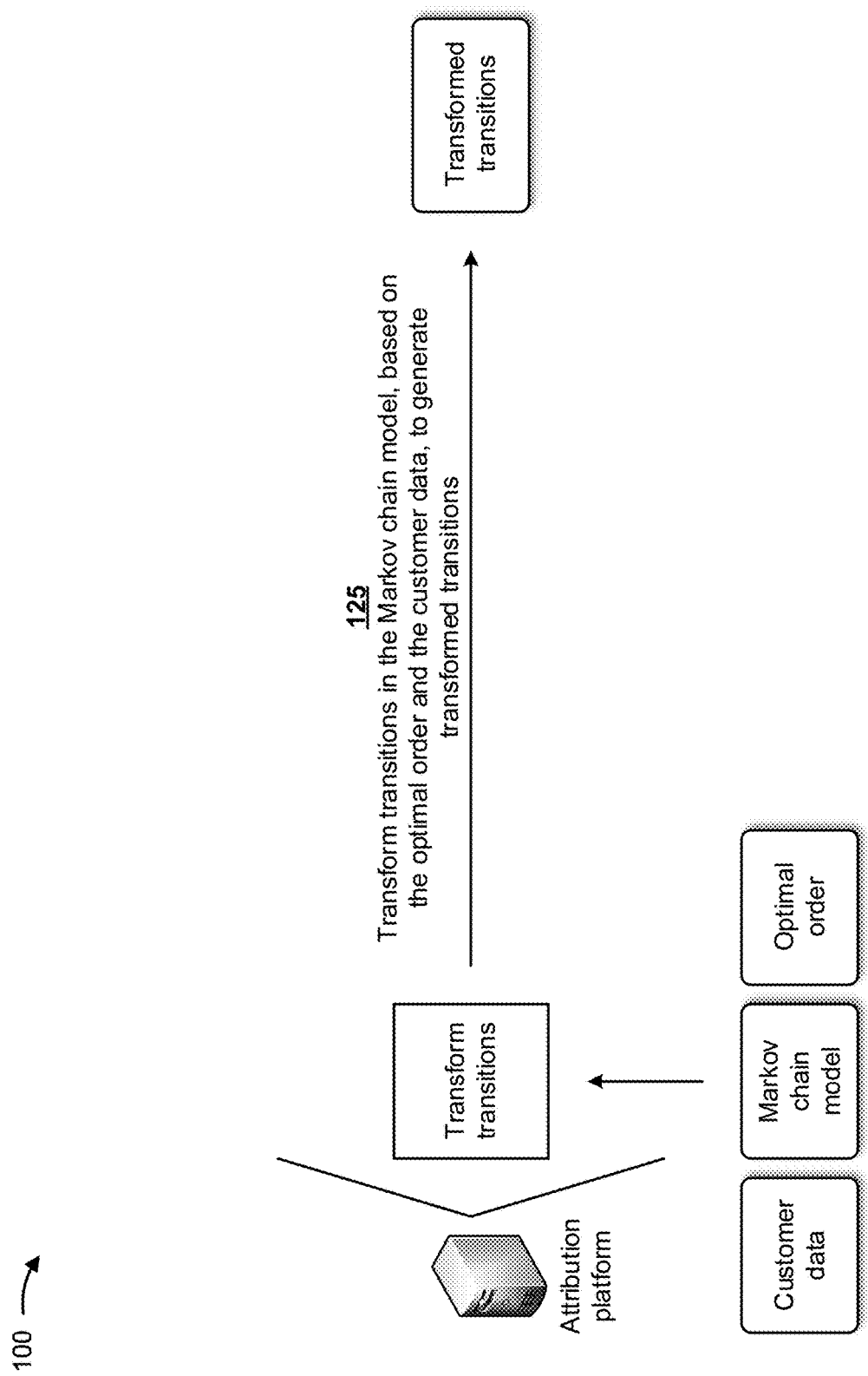

As shown in FIG. 1E, and by reference number 125, the attribution platform may transform transitions in the Markov chain model, based on the optimal order and the customer data, to generate transformed transitions. A transition in the Markov chain model may represent a probability of moving from a current state to a future state. Higher orders of the Markov chain model may include longer customer purchasing sequences that, when converted into transitions, require excessive processing and data storage. Processing and storing such large quantities of data may lead to challenges for capacities of current computing systems. In some implementations, to ensure proper execution of the Markov chain model with the optimal order, attribution platform may transform higher order transitions using different approaches to handle several challenges, such as advanced matrix operations. A higher order Markov chain model may form, by default, rectangular transition matrices that are inconvenient for advance matrix operations (e.g., especially when a quantity number of columns increase with a higher order). Thus, the attribution platform may transform the transitions from a rectangular matrix format to a square matrix format, where the transitions in the square matrix format may correspond to the transformed transitions. A square matrix may be utilized to perform most advanced matrix operations (e.g., an inverse of a matrix).

For higher order Markov chain models, storing a very large transition matrix in memory may be problematic. The attribution platform, instead of storing all combinations of the transition matrix in memory, may store only relevant information of the transition matrix in memory. Higher order Markov chain models may handle multi-length customer journey paths, and lengths of the customer journey paths that are less than an order of the Markov chain model require separate handling. To handle such situations, the attribution platform may create all possible generalized transitions but may select only meaningful transitions, from the generalized transitions, to be stored into memory and further use in modelling. These final transitions may include only transitions which have possible paths in the given data, and which have length less than or equal to the Markov order already selected in previous steps.

Figure 1F:
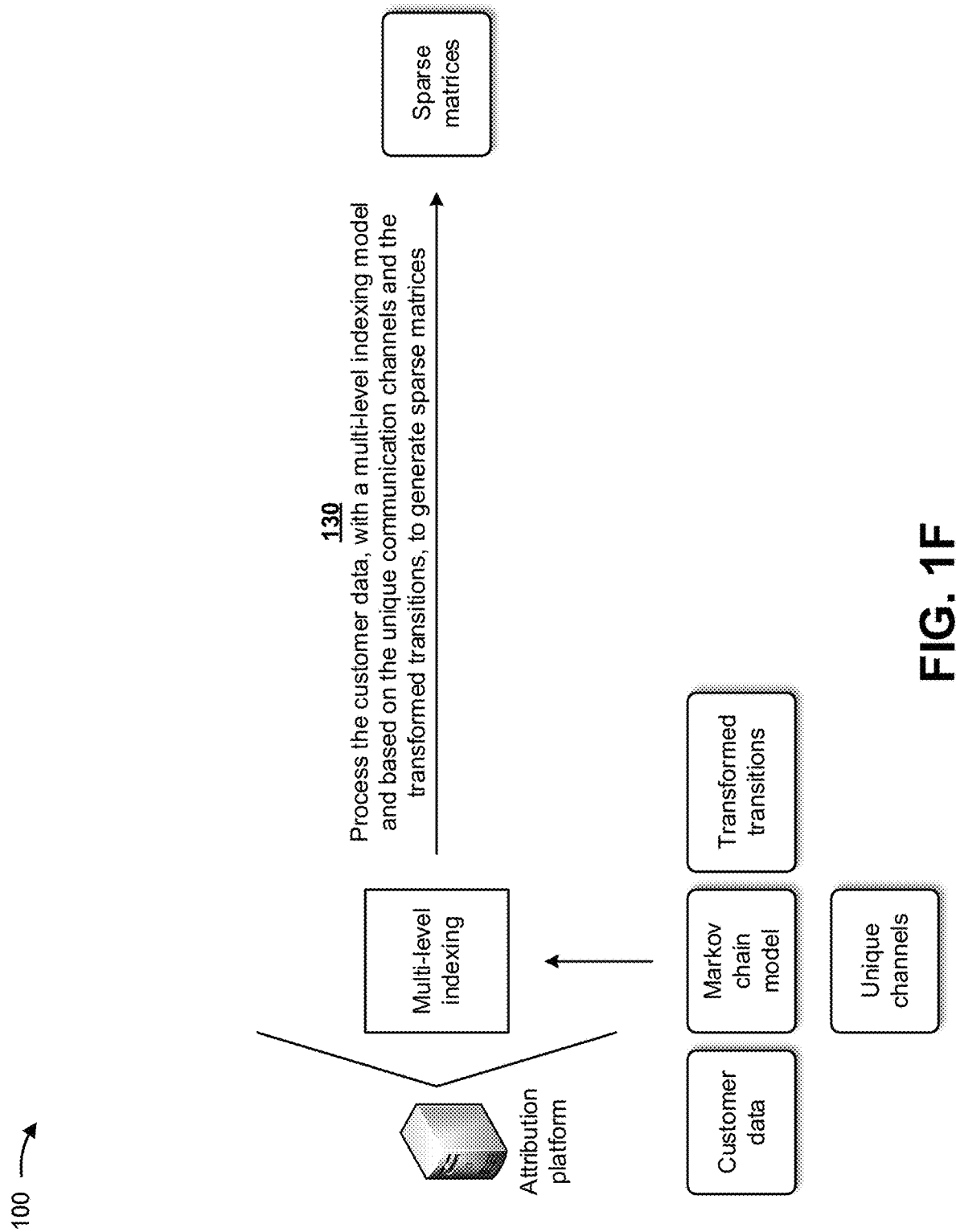

As shown in FIG. 1F, and by reference number 130, the attribution platform may process the customer data, with a multi-level indexing model and based on the unique communication channels and the transformed transitions, to generate sparse matrices. Executing the Markov chain model and performing complex matrix operations on large datasets is challenging. In order to efficiently execute the Markov chain model, the attribution platform may map states to indexes using the multi-level indexing model for transformed index data frames, and may create sparse matrices out of indexed data frames. The attribution platform may utilize an iterative process to handle large matrices. By processing the customer data with the multi-level indexing model, the transition matrix and related datasets may be converted into indexed form which may require lesser memory to store and may also provide computational efficiency.

As shown in FIG. 1G, and by reference number 135, the attribution platform may calculate removal effects and steady state values for the sparse matrices with a linear system of equations. In some implementations, the attribution platform may utilize the linear system of equations to calculate the steady state values for the sparse matrices, and may calculate the removal effects for the sparse matrices based on the steady state values for the sparse matrices. The linear system of equations may be easy to interpret and may enable solution of a large number of variables simultaneously; may not include expensive operations and may removes processing overhead; and may be efficiently used for higher orders of Markov chain models with large datasets.

In some implementations, the attribution platform may break up a transition matrix (e.g., one of the sparse matrices) into a matrix (Q) of communication channels, an identity matrix (I), and a matrix (R) of conversion data, non-conversion data, and the communication channels. The attribution platform may create another matrix (Z) based on the Q matrix and the identity matrix, and may transpose the Z matrix to generate a transposed matrix ($Z^{\tau}$). The attribution platform may transpose the R matrix to generate a transposed matrix ($R^{\tau}$), and may create an equation (e.g., $Z^{\tau}Ans^{\tau}=R^{\tau}$), where Ans may correspond to a steady state matrix that needs to be solved. The attribution platform may compare the steady state matrix to be solved (Ans) to the linear system of equations to generate the solved steady state matrix. In some implementations, the attribution platform may mask the solved steady state matrix for each communication channel to generate a masked matrix. The attribution platform may compare the solved steady state matrix and the masked matrix to determine the removal effects for the sparse matrices.

As shown in FIG. 1H, and by reference number 140, the attribution platform may determine attribution weights for the unique communication channels based on the Markov chain model with the optimal order, the removal effects, and the steady state values. In some implementations, the attribution platform may process the customer data, with the Markov chain model with the optimal order and considering the removal effects and the steady state values, to generate the attribution weights for the unique communication channels. In some implementations, each of the attribution weights may be assigned to each of the unique communication channels, and may include a value (e.g., a percentage value, a value from zero to one, and/or the like) that indicates attribution credit to be allotted to each of the unique communication channels.

Figure 1I:
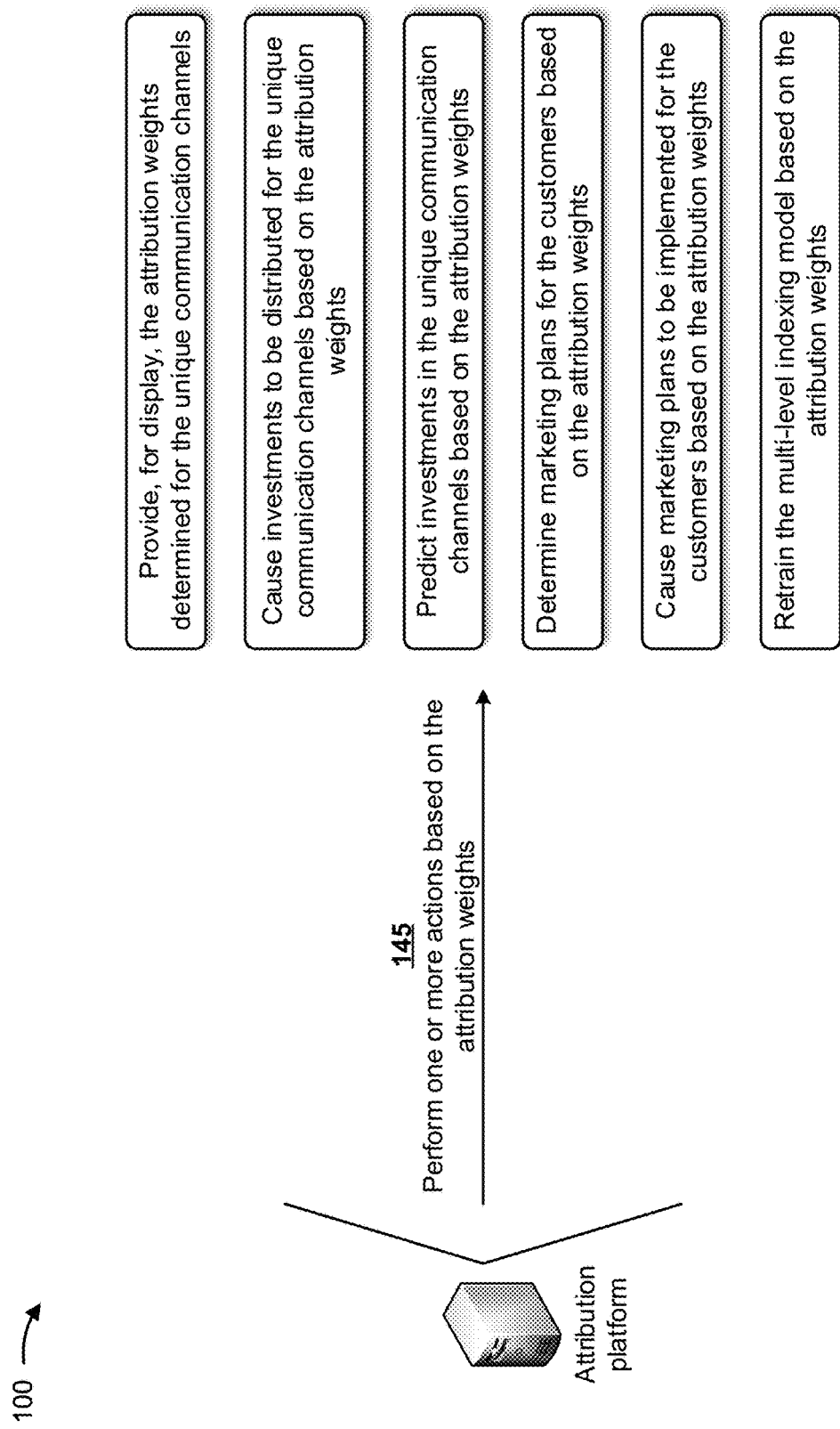

As shown in FIG. 1I, and by reference number 145, the attribution platform may perform one or more actions based on the attribution weights. In some implementations, the one or more actions may include the attribution platform providing, for display, the attribution weights determined for the unique communication channels. For example, the attribution platform may display the attribution weights to marketing personnel, finance personnel, and/or the like of the entity, so that such personnel may make informed decisions about the unique communication channels. In this way, the attribution platform may enable the entity to appropriately allocate resources to the unique communication channels, thereby conserving computing resources (e.g., processing resources, memory resources, communication resources, and/or the like), networking resources, and/or the like that would otherwise be wasted incorrectly allocating resources to communication channels, correcting the incorrectly allocated resources, and/or like.

In some implementations, the one or more actions may include the attribution platform causing investments to be distributed for the unique communication channels based on the attribution weights. For example, if a marketing campaign is allotted a high attribution weight, the entity may provide more money for funding the marketing campaign. In this way, the attribution platform may correctly allocate investments to deserving communication channels, and may conserve computing resources, networking resources, and/or the like that would otherwise be wasted incorrectly allocating resources to communication channels, correcting the incorrectly allocated resources, and/or like.

In some implementations, the one or more actions may include the attribution platform predicting investments in the unique communication channels based on the attribution weights. For example, if an email advertisement is unsuccessful, as indicated by an attribution weight assigned to the email advertisement, the attribution platform may predict that no investments should be provided for the email advertisement going forward. In this way, the attribution platform may proactively predict investments for communication channels, and may take preemptive actions (e.g., allocate funding for high performing communication channels) to ensure that the high performing communication channels continue to be successful, thereby conserving resources that would otherwise be wasted with funding underperforming communication channels.

In some implementations, the one or more actions may include the attribution platform determining marketing plans for the customers based on the attribution weights. For example, if the attribution weights indicate that a social media post successfully sells a first product, the attribution platform may determine a marketing plan to sell a second, similar product via a social media post. In this way, the attribution platform may devise marketing plans that successfully sell products and/or services via successful communication channels, which may conserve resources that would otherwise be wasted with determining marketing plans without such information, revising marketing plans, implementing unsuccessful marketing plans, and/or the like.

In some implementations, the one or more actions may include the attribution platform causing marketing plans to be implemented for the customers based on the attribution weights. For example, if the attribution weights indicate that a telephone call increases brand awareness in a service, the attribution platform may implement telephone calls for other services. In this way, the attribution platform may implement marketing plans that successfully cause brand awareness via successful communication channels, which may conserve resources that would otherwise be wasted with implementing unsuccessful marketing plans, correcting unsuccessful marketing plans, and/or the like.

In some implementations, the one or more actions may include the attribution platform retraining the multi-level indexing model based on the attribution weights. In this way, the attribution platform may improve the accuracy of the multi-level indexing model in processing the customer data for execution by the Markov chain model, which may improve speed and efficiency of the multi-level indexing model and conserve computing resources, networking resources, and/or the like.

In this way, several different stages of the process for determining attribution for communication channels are automated via machine learning, which may remove human subjectivity and waste from the process, and which may improve speed and efficiency of the process and conserve computing resources (e.g., processing resources, memory resources, communication resources, and/or the like), networking resources, and/or the like. Furthermore, implementations described herein use a rigorous, computerized process to perform tasks or roles that were not previously performed or were previously performed using subjective human intuition or input. For example, currently there does not exist a technique that utilizes a machine learning model to determine attribution for communication channels in the manner described herein. Finally, the process for utilizing a machine learning model to determine attribution for communication channels conserves computing resources, networking resources, and/or the like that would otherwise be wasted in selecting an order for the Markov chain model, determining an accuracy of the Markov chain model, storing data for the Markov chain model, configuring software and hardware resources for the Markov chain model, and/or like.

As indicated above, FIGS. 1A-1I are provided merely as examples. Other examples may differ from what is described with regard to FIGS. 1A-1I.

Figure 2:
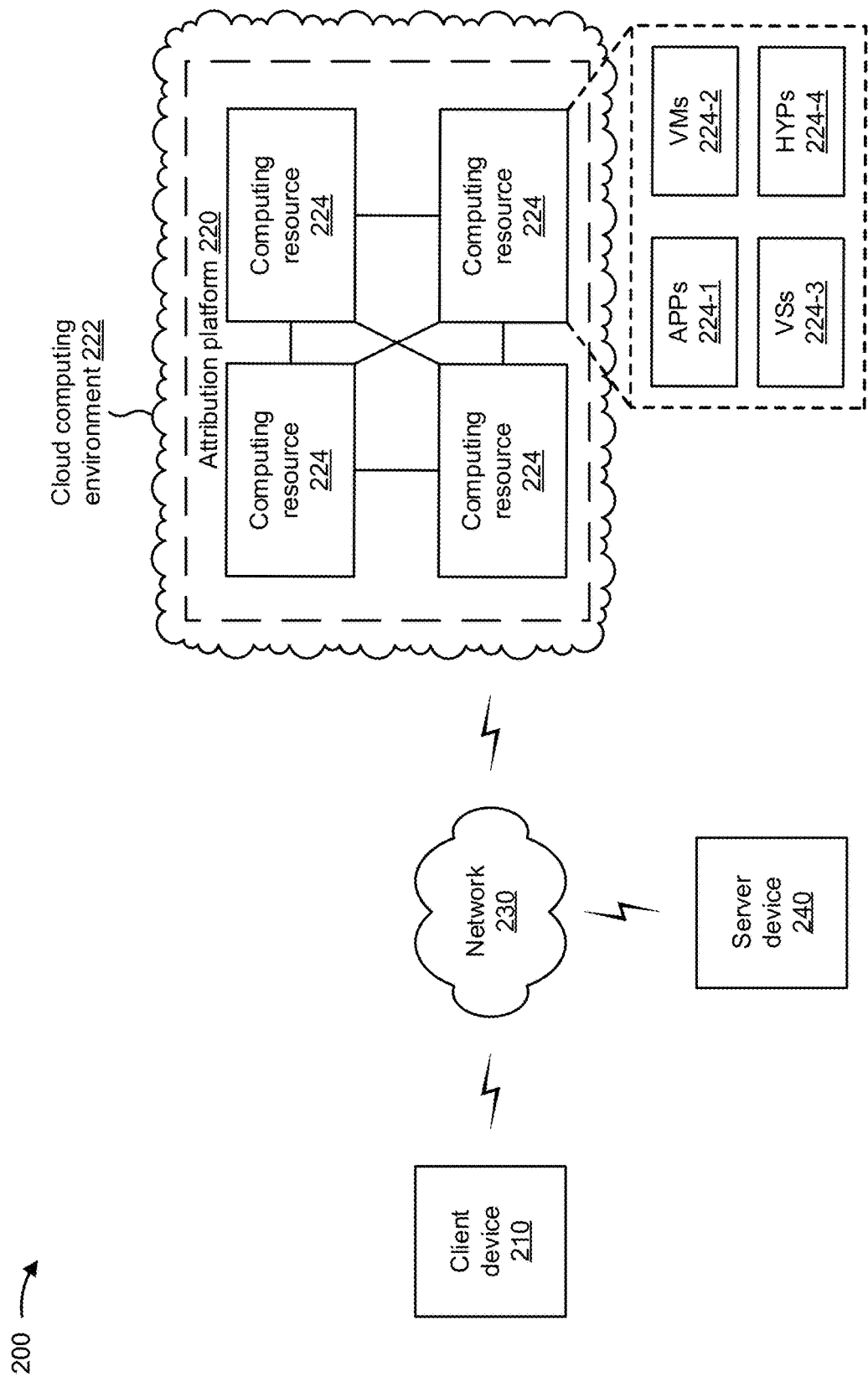
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an attribution platform 220, a network 230, and a server device 240. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 210 may receive information from and/or transmit information to attribution platform 220 and/or server device 240.

Attribution platform 220 includes one or more devices that utilize a machine learning model to determine attribution for communication channels. In some implementations, attribution platform 220 may be designed to be modular such that certain software components may be swapped in or out depending on a particular need. As such, attribution platform 220 may be easily and/or quickly reconfigured for different uses. In some implementations, attribution platform 220 may receive information from and/or transmit information to one or more client devices 210 and/or server devices 240.

In some implementations, as shown, attribution platform 220 may be hosted in a cloud computing environment 222. Notably, while implementations described herein describe attribution platform 220 as being hosted in cloud computing environment 222, in some implementations, attribution platform 220 may not be cloud-based (i.e., may be implemented outside of a cloud computing environment) or may be partially cloud-based.

Cloud computing environment 222 includes an environment that hosts attribution platform 220. Cloud computing environment 222 may provide computation, software, data access, storage, etc., services that do not require end-user knowledge of a physical location and configuration of system(s) and/or device(s) that hosts attribution platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host attribution platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210 and/or server device 240. Application 224-1 may eliminate a need to install and execute the software applications on client device 210. For example, application 224-1 may include software associated with attribution platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of attribution platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Server device 240 includes one or more devices capable of receiving, generating, storing, processing, and/or providing information, such as information described herein. For example, server device 240 may include a laptop computer, a tablet computer, a desktop computer, a group of server devices, or a similar type of device. In some implementations, server device 240 may receive information from and/or transmit information to client device 210 and/or attribution platform 220.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
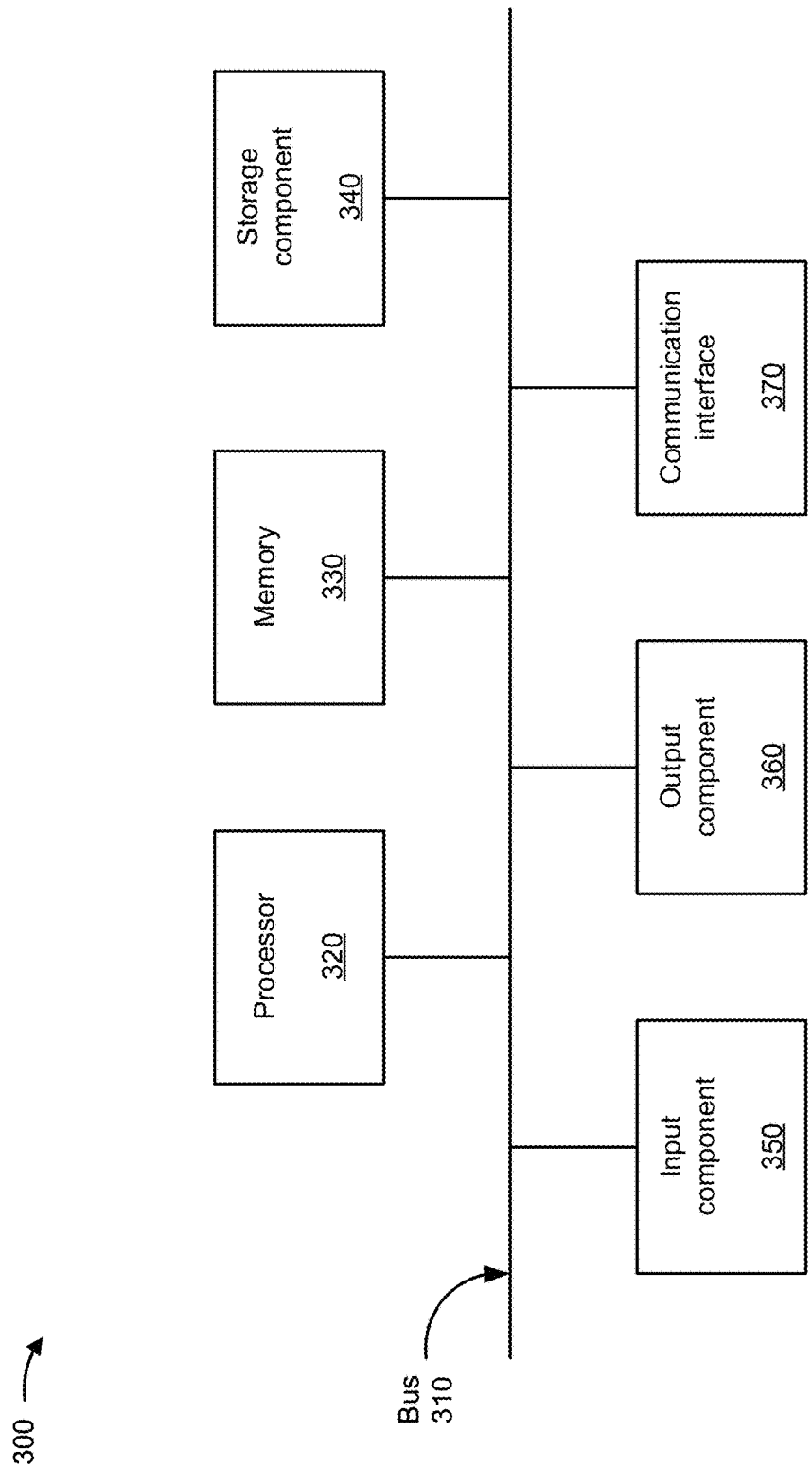
FIG. 3 is a diagram of example components of one or more devices of FIG. 2.

FIG. 3 is a diagram of example components of a device 300. Device 300 may correspond to client device 210, attribution platform 220, computing resource 224, and/or server device 240. In some implementations, client device 210, attribution platform 220, computing resource 224, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
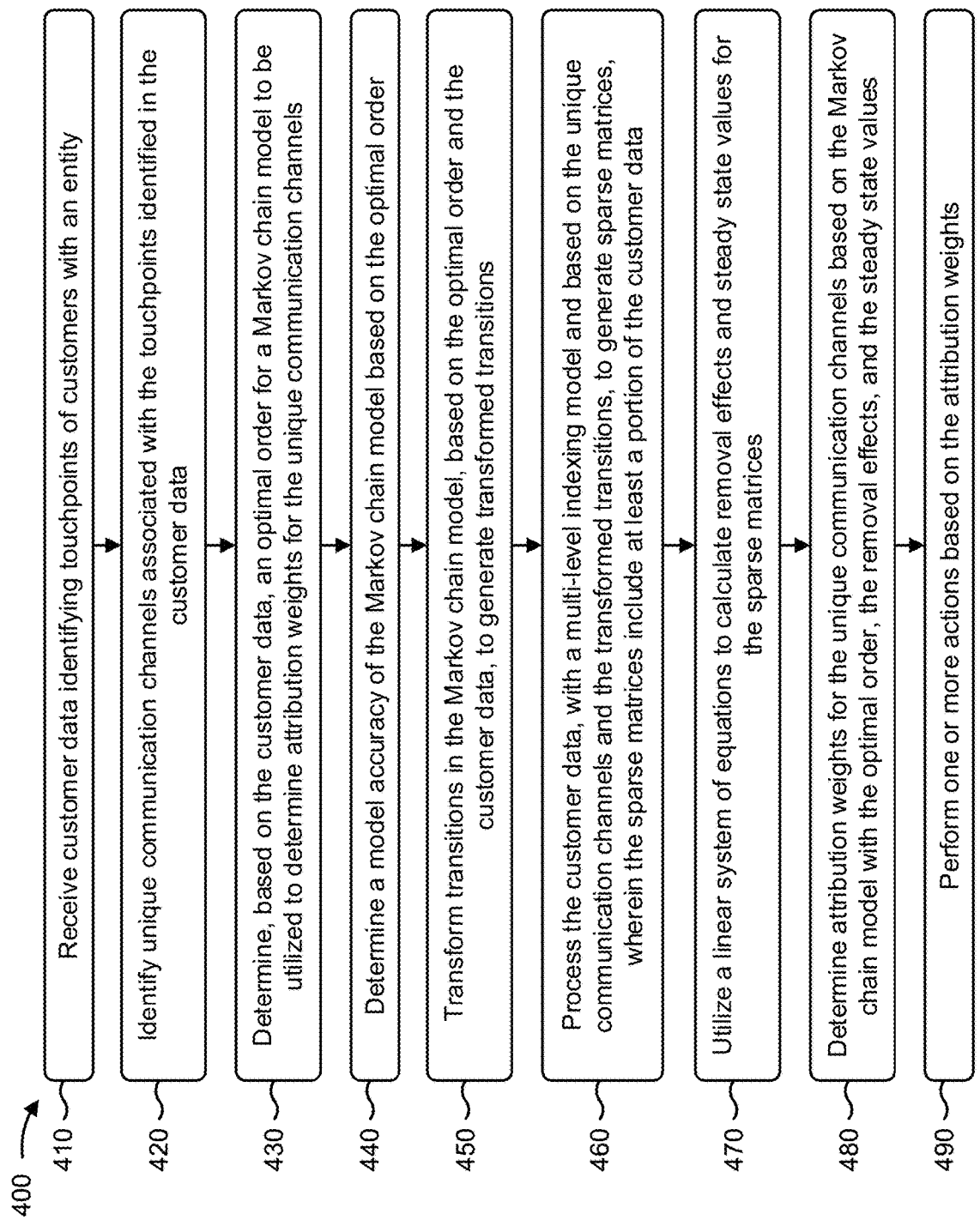
FIGS. 4-6 are flow charts of example processes for utilizing a machine learning model to determine attribution for communication channels.

FIG. 4 is a flow chart of an example process 400 for utilizing a machine learning model to determine attribution for communication channels. In some implementations, one or more process blocks of FIG. 4 may be performed by a device (e.g., attribution platform 220). In some implementations, one or more process blocks of FIG. 4 may be performed by another device or a group of devices separate from or including the device, such as a client device (e.g., client device 210), a server device (e.g., server device 240), and/or the like.

As shown in FIG. 4, process 400 may include receiving customer data identifying touchpoints of customers with an entity (block 410). For example, the device (e.g., using computing resource 224, processor 320, communication interface 370, and/or the like) may receive customer data identifying touchpoints of customers with an entity, as described above.

As further shown in FIG. 4, process 400 may include identifying unique communication channels associated with the touchpoints identified in the customer data (block 420). For example, the device (e.g., using computing resource 224, processor 320, memory 330, and/or the like) may identify unique communication channels associated with the touchpoints identified in the customer data, as described above.

As further shown in FIG. 4, process 400 may include determining, based on the customer data, an optimal order for a Markov chain model to be utilized to determine attribution weights for the unique communication channels (block 430). For example, the device (e.g., using computing resource 224, processor 320, storage component 340, and/or the like) may determine, based on the customer data, an optimal order for a Markov chain model to be utilized to determine attribution weights for the unique communication channels, as described above.

As further shown in FIG. 4, process 400 may include determining a model accuracy of the Markov chain model based on the optimal order (block 440). For example, the device (e.g., using computing resource 224, processor 320, memory 330, storage component 340, and/or the like) may determine a model accuracy of the Markov chain model based on the optimal order, as described above.

As further shown in FIG. 4, process 400 may include transforming transitions in the Markov chain model, based on the optimal order and the customer data, to generate transformed transitions (block 450). For example, the device (e.g., using computing resource 224, processor 320, memory 330, and/or the like) may transform transitions in the Markov chain model, based on the optimal order and the customer data, to generate transformed transitions, as described above.

As further shown in FIG. 4, process 400 may include processing the customer data, with a multi-level indexing model and based on the unique communication channels and the transformed transitions, to generate sparse matrices, wherein the sparse matrices include at least a portion of the customer data (block 460). For example, the device (e.g., using computing resource 224, processor 320, storage component 340, and/or the like) may process the customer data, with a multi-level indexing model and based on the unique communication channels and the transformed transitions, to generate sparse matrices, as described above. In some implementations, the sparse matrices may include at least a portion of the customer data.

As further shown in FIG. 4, process 400 may include utilizing a linear system of equations to calculate removal effects and steady state values for the sparse matrices (block 470). For example, the device (e.g., using computing resource 224, processor 320, memory 330, storage component 340, and/or the like) may utilize a linear system of equations to calculate removal effects and steady state values for the sparse matrices, as described above.

As further shown in FIG. 4, process 400 may include determining attribution weights for the unique communication channels based on the Markov chain model with the optimal order, the removal effects, and the steady state values (block 480). For example, the device (e.g., using computing resource 224, processor 320, memory 330, and/or the like) may determine attribution weights for the unique communication channels based on the Markov chain model with the optimal order, the removal effects, and the steady state values, as described above.

As further shown in FIG. 4, process 400 may include performing one or more actions based on the attribution weights (block 490). For example, the device (e.g., using computing resource 224, processor 320, memory 330, storage component 340, communication interface 370, and/or the like) may perform one or more actions based on the attribution weights, as described above.

Process 400 may include additional implementations, such as any single implementation or any combination of implementations described below and/or in connection with one or more other processes described elsewhere herein.

In a first implementation, determining the optimal order for the Markov chain model may include determining a first calculated lowest score order for the Markov chain model based on a first technique; determining a second calculated lowest score order for the Markov chain model based on a second technique; utilizing a combination of the first technique and the second technique to determine the optimal order when the first calculated lowest score order is equivalent to the second calculated lowest score order; and utilizing a third technique to determine the optimal order when the first calculated lowest score order is not equivalent to the second calculated lowest score order.

In a second implementation, alone or in combination with the first implementation, the first technique may be based on a smallest Akaike's information criterion technique value, the second technique may be based on a smallest Bayesian information criterion technique value, and the third technique may be based on a greatest log likelihood technique value.

In a third implementation, alone or in combination with one or more of the first and second implementations, determining the model accuracy of the Markov chain model may include classifying the Markov chain model, based on a log odds ratio, to predict customer conversion and customer non-conversion data; identifying a threshold for determining a likelihood probability for conversions based on classifying the Markov chain model; generating a confusion matrix for model validation based on the threshold; comparing, based on the confusion matrix, an accuracy of the optimal order of the Markov chain model with previous and subsequent orders of the Markov chain model; and determining the model accuracy of the Markov chain model based on comparing the accuracy of the optimal order.

In a fourth implementation, alone or in combination with one or more of the first through third implementations, classifying the Markov chain model may include processing the Markov chain model, with a supervised machine learning model for sequential data, to predict the customer conversion and customer non-conversion data.

In a fifth implementation, alone or in combination with one or more of the first through fourth implementations, transforming the transitions in the Markov chain model, based on the optimal order and the customer data, to generate the transformed transitions may include selecting generalized transitions, from the transitions, as the transformed transitions; storing only transitions with non-zero values, from the transitions, as the transformed transitions; transforming the transitions from a rectangular matrix format to a square matrix format, the transitions in the square matrix format correspond to the transformed transitions; selecting transitions associated with customer journeys, from the transitions, as the transformed transitions; or selecting transitions less than or equal to a particular customer journey, from the transitions, as the transformed transitions.

In a sixth implementation, alone or in combination with one or more of the first through fifth implementations, processing the customer data, with the multi-level indexing model and based on the unique communication channels and the transformed transitions, to generate sparse matrices may include utilizing the multi-level indexing model to establish relationships between the customer data based on the unique communication channels and the transformed transitions; and generating the sparse matrices based on the relationships between the customer data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
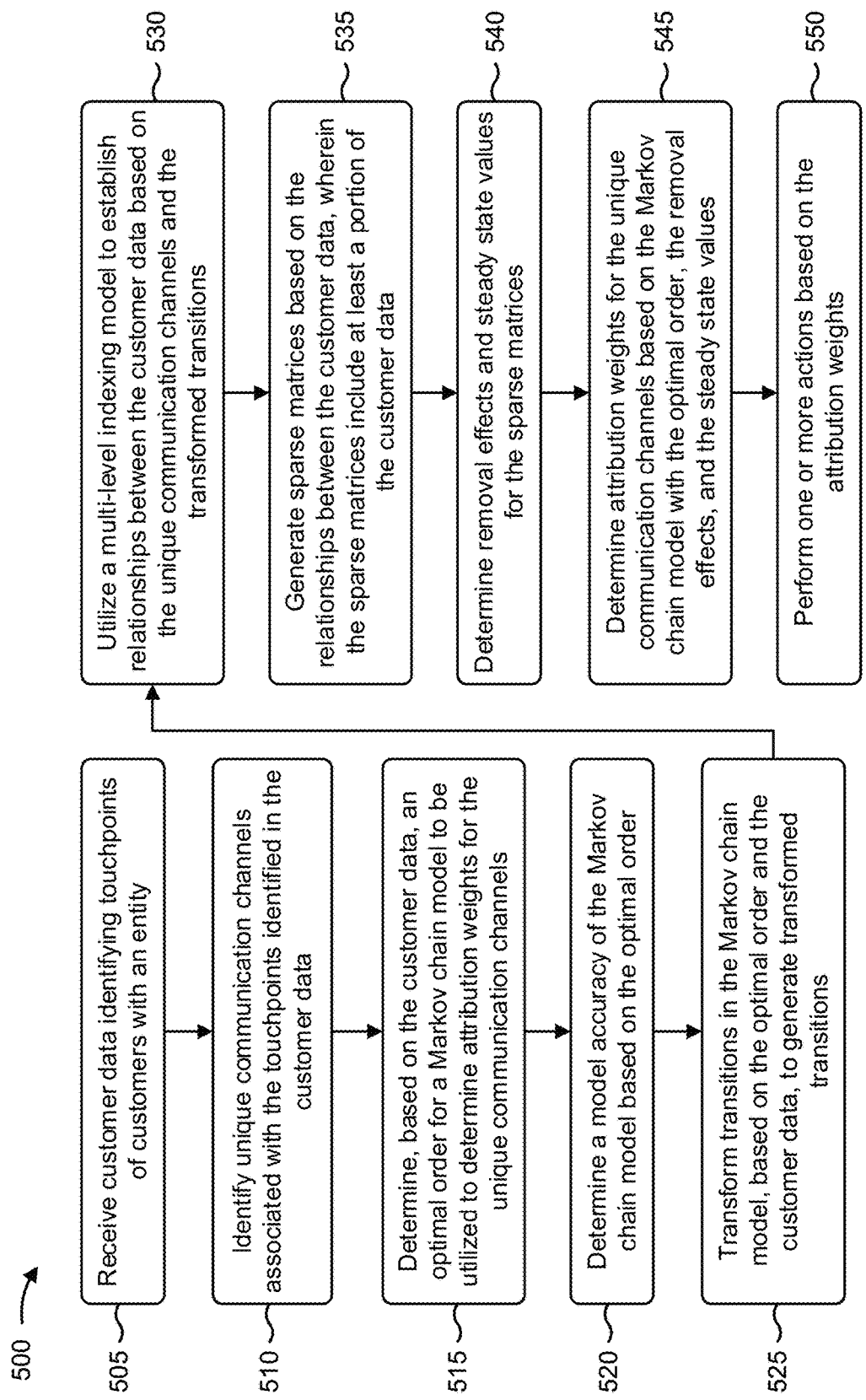

FIG. 5 is a flow chart of an example process 500 for utilizing a machine learning model to determine attribution for communication channels. In some implementations, one or more process blocks of FIG. 5 may be performed by a device (e.g., attribution platform 220). In some implementations, one or more process blocks of FIG. 5 may be performed by another device or a group of devices separate from or including the device, such as a client device (e.g., client device 210), a server device (e.g., server device 240), and/or the like.

As shown in FIG. 5, process 500 may include receiving customer data identifying touchpoints of customers with an entity (block 505). For example, the device (e.g., using computing resource 224, processor 320, communication interface 370, and/or the like) may receive customer data identifying touchpoints of customers with an entity, as described above.

As further shown in FIG. 5, process 500 may include identifying unique communication channels associated with the touchpoints identified in the customer data (block 510). For example, the device (e.g., using computing resource 224, processor 320, memory 330, and/or the like) may identify unique communication channels associated with the touchpoints identified in the customer data, as described above.

As further shown in FIG. 5, process 500 may include determining, based on the customer data, an optimal order for a Markov chain model to be utilized to determine attribution weights for the unique communication channels (block 515). For example, the device (e.g., using computing resource 224, processor 320, storage component 340, and/or the like) may determine, based on the customer data, an optimal order for a Markov chain model to be utilized to determine attribution weights for the unique communication channels, as described above.

As further shown in FIG. 5, process 500 may include determining a model accuracy of the Markov chain model based on the optimal order (block 520). For example, the device (e.g., using computing resource 224, processor 320, memory 330, storage component 340, and/or the like) may determine a model accuracy of the Markov chain model based on the optimal order, as described above.

As further shown in FIG. 5, process 500 may include transforming transitions in the Markov chain model, based on the optimal order and the customer data, to generate transformed transitions (block 525). For example, the device (e.g., using computing resource 224, processor 320, memory 330, and/or the like) may transform transitions in the Markov chain model, based on the optimal order and the customer data, to generate transformed transitions, as described above.

As further shown in FIG. 5, process 500 may include utilizing a multi-level indexing model to establish relationships between the customer data based on the unique communication channels and the transformed transitions (block 530). For example, the device (e.g., using computing resource 224, processor 320, storage component 340, and/or the like) may utilize a multi-level indexing model to establish relationships between the customer data based on the unique communication channels and the transformed transitions, as described above.

As further shown in FIG. 5, process 500 may include generating sparse matrices based on the relationships between the customer data, wherein the sparse matrices include at least a portion of the customer data (block 535). For example, the device (e.g., using computing resource 224, processor 320, memory 330, storage component 340, and/or the like) may generate sparse matrices based on the relationships between the customer data, as described above. In some implementations, the sparse matrices may include at least a portion of the customer data.

As further shown in FIG. 5, process 500 may include determining removal effects and steady state values for the sparse matrices (block 540). For example, the device (e.g., using computing resource 224, processor 320, memory 330, and/or the like) may determine removal effects and steady state values for the sparse matrices, as described above.

As further shown in FIG. 5, process 500 may include determining attribution weights for the unique communication channels based on the Markov chain model with the optimal order, the removal effects, and the steady state values (block 545). For example, the device (e.g., using computing resource 224, processor 320, storage component 340, and/or the like) may determine attribution weights for the unique communication channels based on the Markov chain model with the optimal order, the removal effects, and the steady state values, as described above.

As further shown in FIG. 5, process 500 may include performing one or more actions based on the attribution weights (block 550). For example, the device (e.g., using computing resource 224, processor 320, memory 330, storage component 340, communication interface 370, and/or the like) may perform one or more actions based on the attribution weights, as described above.

Process 500 may include additional implementations, such as any single implementation or any combination of implementations described below and/or in connection with one or more other processes described elsewhere herein.

In a first implementation, determining the removal effects and the steady state values for the sparse matrices may include utilizing a linear system of equations to calculate the steady state values for the sparse matrices; and calculating the removal effects for the sparse matrices based on the steady state values for the sparse matrices.

In a second implementation, alone or in combination with the first implementation, performing the one or more actions may include providing, for display, the attribution weights determined for the unique communication channels; causing investments to be distributed for the unique communication channels based on the attribution weights; or predicting investments in the unique communication channels based on the attribution weights.

In a third implementation, alone or in combination with one or more of the first and second implementations, performing the one or more actions may include determining marketing plans for the customers based on the attribution weights; causing marketing plans to be implemented for the customers based on the attribution weights; or retraining the multi-level indexing model based on the attribution weights.

In a fourth implementation, alone or in combination with one or more of the first through third implementations, performing the one or more actions may include measuring impacts of current investments in the unique communication channels based on the attribution weights; and determining budgets for the unique communication channels based on the impacts.

In a fifth implementation, alone or in combination with one or more of the first through fourth implementations, performing the one or more actions may include determining a personalized engagement strategy for each of the customers based on the attribution weights.

In a sixth implementation, alone or in combination with one or more of the first through fifth implementations, determining the attribution weights for the unique communication channels may include parallel processing the customer data, with the Markov chain model with the optimal order and based on the removal effects and the steady state values, to determine the attribution weights for the unique communication channels.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
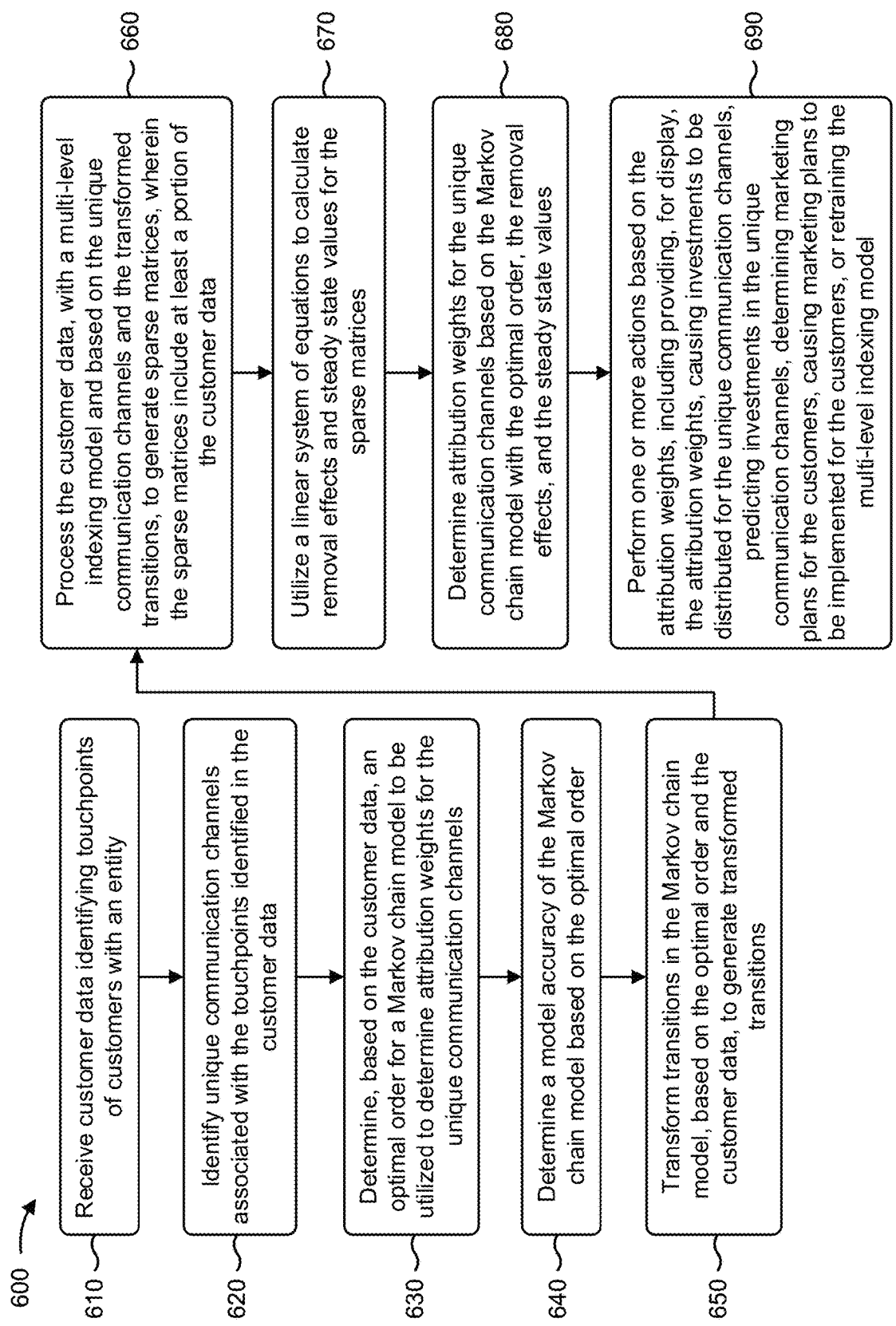

FIG. 6 is a flow chart of an example process 600 for utilizing a machine learning model to determine attribution for communication channels. In some implementations, one or more process blocks of FIG. 6 may be performed by a device (e.g., attribution platform 220). In some implementations, one or more process blocks of FIG. 6 may be performed by another device or a group of devices separate from or including the device, such as a client device (e.g., client device 210), a server device (e.g., server device 240), and/or the like.

As shown in FIG. 6, process 600 may include receiving customer data identifying touchpoints of customers with an entity (block 610). For example, the device (e.g., using computing resource 224, processor 320, communication interface 370, and/or the like) may receive customer data identifying touchpoints of customers with an entity, as described above.

As further shown in FIG. 6, process 600 may include identifying unique communication channels associated with the touchpoints identified in the customer data (block 620). For example, the device (e.g., using computing resource 224, processor 320, memory 330, and/or the like) may identify unique communication channels associated with the touchpoints identified in the customer data, as described above.

As further shown in FIG. 6, process 600 may include determining, based on the customer data, an optimal order for a Markov chain model to be utilized to determine attribution weights for the unique communication channels (block 630). For example, the device (e.g., using computing resource 224, processor 320, storage component 340, and/or the like) may determine, based on the customer data, an optimal order for a Markov chain model to be utilized to determine attribution weights for the unique communication channels, as described above.

As further shown in FIG. 6, process 600 may include determining a model accuracy of the Markov chain model based on the optimal order (block 640). For example, the device (e.g., using computing resource 224, processor 320, memory 330, storage component 340, and/or the like) may determine a model accuracy of the Markov chain model based on the optimal order, as described above.

As further shown in FIG. 6, process 600 may include transforming transitions in the Markov chain model, based on the optimal order and the customer data, to generate transformed transitions (block 650). For example, the device (e.g., using computing resource 224, processor 320, memory 330, and/or the like) may transform transitions in the Markov chain model, based on the optimal order and the customer data, to generate transformed transitions, as described above.

As further shown in FIG. 6, process 600 may include processing the customer data, with a multi-level indexing model and based on the unique communication channels and the transformed transitions, to generate sparse matrices, wherein the sparse matrices include at least a portion of the customer data (block 660). For example, the device (e.g., using computing resource 224, processor 320, storage component 340, and/or the like) may process the customer data, with a multi-level indexing model and based on the unique communication channels and the transformed transitions, to generate sparse matrices, as described above. In some implementations, the sparse matrices may include at least a portion of the customer data.

As further shown in FIG. 6, process 600 may include utilizing a linear system of equations to calculate removal effects and steady state values for the sparse matrices (block 670). For example, the device (e.g., using computing resource 224, processor 320, memory 330, storage component 340, and/or the like) may utilize a linear system of equations to calculate removal effects and steady state values for the sparse matrices, as described above.

As further shown in FIG. 6, process 600 may include determining attribution weights for the unique communication channels based on the Markov chain model with the optimal order, the removal effects, and the steady state values (block 680). For example, the device (e.g., using computing resource 224, processor 320, memory 330, and/or the like) may determine attribution weights for the unique communication channels based on the Markov chain model with the optimal order, the removal effects, and the steady state values, as described above.

As further shown in FIG. 6, process 600 may include performing one or more actions based on the attribution weights, wherein the one or more actions may include providing, for display, the attribution weights determined for the unique communication channels, causing investments to be distributed for the unique communication channels based on the attribution weights, predicting investments in the unique communication channels based on the attribution weights, determining marketing plans for the customers based on the attribution weights, causing marketing plans to be implemented for the customers based on the attribution weights, or retraining the multi-level indexing model based on the attribution weights (block 690). For example, the device (e.g., using computing resource 224, processor 320, memory 330, storage component 340, communication interface 370, and/or the like) may perform one or more actions based on the attribution weights, as described above. In some implementations, the one or more actions may include providing, for display, the attribution weights determined for the unique communication channels, causing investments to be distributed for the unique communication channels based on the attribution weights, predicting investments in the unique communication channels based on the attribution weights, determining marketing plans for the customers based on the attribution weights, causing marketing plans to be implemented for the customers based on the attribution weights, or retraining the multi-level indexing model based on the attribution weights.

Process 600 may include additional implementations, such as any single implementation or any combination of implementations described below and/or in connection with one or more other processes described elsewhere herein.

In a first implementation, determining the optimal order for the Markov chain model may include determining a first calculated lowest score order for the Markov chain model based on a first technique; determining a second calculated lowest score order for the Markov chain model based on a second technique; utilizing a combination of the first technique and the second technique to determine the optimal order when the first calculated lowest score order is equivalent to the second calculated lowest score order; and utilizing a third technique to determine the optimal order when the first calculated lowest score order is not equivalent to the second calculated lowest score order.

In a second implementation, alone or in combination with the first implementation, determining the model accuracy of the Markov chain model may include classifying the Markov chain model, based on a log odds ratio, to predict of customer conversion and customer non-conversion data; identifying a threshold for determining a likelihood probability for conversions based on classifying the Markov chain model; generating a confusion matrix for model validation based on the threshold; comparing, based on the confusion matrix, an accuracy of the optimal order of the Markov chain model with previous and subsequent orders of the Markov chain model; and determining the model accuracy of the Markov chain model based on comparing the accuracy of the optimal order.

In a third implementation, alone or in combination with one or more of the first and second implementations, transforming the transitions in the Markov chain model, based on the optimal order and the customer data, to generate the transformed transitions may include selecting generalized transitions, from the transitions, as the transformed transitions; storing only transitions with non-zero values, from the transitions, as the transformed transitions; transforming the transitions from a rectangular matrix format to a square matrix format, wherein the transitions in the square matrix format correspond to the transformed transitions; selecting transitions associated with customer journeys, from the transitions, as the transformed transitions; or selecting transitions less than or equal to a particular customer journey, from the transitions, as the transformed transitions.

In a fourth implementation, alone or in combination with one or more of the first through third implementations, utilizing the linear system of equations to calculate the removal effects and the steady state values for the sparse matrices may include utilizing the linear system of equations to calculate the steady state values for the sparse matrices; and calculating the removal effects for the sparse matrices based on the steady state values for the sparse matrices.

In a fifth implementation, alone or in combination with one or more of the first through fourth implementations, process 600 may include measuring impacts of current investments in the unique communication channels based on the attribution weights; and determining budgets for the unique communication channels based on the impacts.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, customer data identifying touchpoints of customers with an entity,
      wherein the customer data is data associated with one or more marketing channels or one or more marketing campaigns;
   identifying, by the device, unique communication channels associated with the touchpoints identified in the customer data;
   determining, by the device and based on the customer data, an optimal order for a Markov chain model to be utilized to determine attribution weights for the unique communication channels;
   determining, by the device, a model accuracy of the Markov chain model, based on the optimal order;
   transforming, by the device, transitions in the Markov chain model, based on the optimal order and the customer data, to generate transformed transitions;
   training, by the device, a multi-level indexing model to establish relationships between the customer data based on the unique communication channels and the transformed transitions;
   processing, by the device, the customer data, with the multi-level indexing model and based on the unique communication channels and the transformed transitions, to generate sparse matrices,
      wherein the sparse matrices include at least a portion of the customer data;
   utilizing, by the device, a linear system of equations to calculate removal effects and steady state values for the sparse matrices;
   determining, by the device, the attribution weights for the unique communication channels based on the Markov chain model with the optimal order, the removal effects, and the steady state values; and
   performing, by the device, one or more actions associated with customer sales or customer conversion based on the attribution weights,
      wherein performing the one or more actions comprises:
         causing marketing plans to be implemented for the customers based on the attribution weights; and
         retraining the multi-level indexing model based on the attribution weights.

2. The method of claim 1, wherein determining the optimal order for the Markov chain model comprises:
   determining a first calculated lowest score order for the Markov chain model based on a first technique;
   determining a second calculated lowest score order for the Markov chain model based on a second technique;
   utilizing a combination of the first technique and the second technique to determine the optimal order when the first calculated lowest score order is equivalent to the second calculated lowest score order; and
   utilizing a third technique to determine the optimal order when the first calculated lowest score order is not equivalent to the second calculated lowest score order.

3. The method of claim 2, wherein:
   the first technique is based on a smallest Akaike's information criterion technique value, the second technique is based on a smallest Bayesian information criterion technique value, and the third technique is based on a greatest log likelihood technique value.

4. The method of claim 1, wherein determining the model accuracy of the Markov chain model comprises:

classifying the Markov chain model, based on a log odds ratio, to predict customer conversion and customer non-conversion data;

identifying a threshold for determining a likelihood probability for conversions based on classifying the Markov chain model;

generating a confusion matrix for model validation based on the threshold;

comparing, based on the confusion matrix, an accuracy of the optimal order of the Markov chain model with previous and subsequent orders of the Markov chain model; and determining the model accuracy of the Markov chain model based on comparing the accuracy of the optimal order.

5. The method of claim 4, wherein classifying the Markov chain model comprises:

processing the Markov chain model, with a supervised machine learning model for sequential data, to predict the customer conversion and customer non-conversion data.

6. The method of claim 1, wherein transforming the transitions in the Markov chain model, based on the optimal order and the customer data, to generate the transformed transitions comprises one or more of:

selecting generalized transitions, from the transitions, as the transformed transitions;

storing only transitions with non-zero values, from the transitions, as the transformed transitions;

transforming the transitions from a rectangular matrix format to a square matrix format,
wherein the transitions in the square matrix format correspond to the transformed transitions;

selecting transitions associated with customer journeys, from the transitions, as the transformed transitions; or selecting transitions less than or equal to a particular customer journey, from the transitions, as the transformed transitions.

7. The method of claim 1, wherein processing the customer data, with the multi-level indexing model and based on the unique communication channels and the transformed transitions, to generate sparse matrices comprises:

utilizing the multi-level indexing model to establish relationships between the customer data based on the unique communication channels and the transformed transitions; and generating the sparse matrices based on the relationships between the customer data.

8. A device, comprising:

one or more memories; and one or more processors, communicatively coupled to the one or more memories, configured to:

receive customer data identifying touchpoints of customers with an entity,
wherein the customer data is data associated with one or more marketing channels or one or more marketing campaigns;

identify unique communication channels associated with the touchpoints identified in the customer data;

determine, based on the customer data, an optimal order for a Markov chain model to be utilized to determine attribution weights for the unique communication channels;

determine a model accuracy of the Markov chain model based on the optimal order;

transform transitions in the Markov chain model, based on the optimal order and the customer data, to generate transformed transitions;

train a multi-level indexing model to establish relationships between the customer data based on the unique communication channels and the transformed transitions;

utilize the multi-level indexing model to establish relationships between the customer data based on the unique communication channels and the transformed transitions;

generate sparse matrices based on the relationships between the customer data,
wherein the sparse matrices include at least a portion of the customer data;

determine removal effects and steady state values for the sparse matrices;

determine attribution weights for the unique communication channels based on the Markov chain model with the optimal order, the removal effects, and the steady state values; and perform one or more actions associated with customer sales or customer conversion based on the attribution weights,
wherein the one or more processors, when performing the one or more actions, are to:
cause marketing plans to be implemented for the customers based on the attribution weights; and
retrain the multi-level indexing model based on the attribution weights.

9. The device of claim 8, wherein the one or more processors, when determining the removal effects and the steady state values for the sparse matrices, are configured to:

utilize a linear system of equations to calculate the steady state values for the sparse matrices; and calculate the removal effects for the sparse matrices based on the steady state values for the sparse matrices.

10. The device of claim 8, wherein the one or more processors, when performing the one or more actions, are configured to at least one of:

provide, for display, the attribution weights determined for the unique communication channels;

cause investments to be distributed for the unique communication channels based on the attribution weights; or predict investments in the unique communication channels based on the attribution weights.

11. The device of claim 8, wherein the one or more processors, when performing the one or more actions, are configured to cause marketing plans to be implemented for the customers based on the attribution weights.

12. The device of claim 8, wherein the one or more processors, when performing the one or more actions, are configured to:

measure impacts of current investments in the unique communication channels based on the attribution weights; and determine budgets for the unique communication channels based on the impacts.

13. The device of claim 8, wherein the one or more processors, when performing the one or more actions, are configured to:
  determine a personalized engagement strategy for each of the customers based on the attribution weights.

14. The device of claim 8, wherein the one or more processors, when determining the attribution weights for the unique communication channels, are configured to:
  parallel process the customer data, with the Markov chain model with the optimal order and based on the removal effects and the steady state values, to determine the attribution weights for the unique communication channels.

15. A non-transitory computer-readable medium storing instructions, the instructions comprising:
  one or more instructions that, when executed by one or more processors, cause the one or more processors to:
    receive customer data identifying touchpoints of customers with an entity,
      wherein the customer data is data associated with one or more marketing channels or one or more marketing campaigns;
    identify unique communication channels associated with the touchpoints identified in the customer data;
    determine, based on the customer data, an optimal order for a Markov chain model to be utilized to determine attribution weights for the unique communication channels;
    determine a model accuracy of the Markov chain model based on the optimal order;
    transform transitions in the Markov chain model, based on the optimal order and the customer data, to generate transformed transitions;
    train a multi-level indexing model to establish relationships between the customer data based on the unique communication channels and the transformed transitions;
    process the customer data, with the multi-level indexing model and based on the unique communication channels and the transformed transitions, to generate sparse matrices,
      wherein the sparse matrices include at least a portion of the customer data;
    utilize a linear system of equations to calculate removal effects and steady state values for the sparse matrices;
    determine attribution weights for the unique communication channels based on the Markov chain model with the optimal order, the removal effects, and the steady state values; and
    perform one or more actions associated with customer sales or customer conversion based on the attribution weights,
      wherein the one or more instructions, that cause the one or more processors to perform the one or more actions, cause the one or more processors to at least:
        determine marketing plans for the customers based on the attribution weights, and
        retrain the multi-level indexing model based on the attribution weights.

16. The non-transitory computer-readable medium of claim 15, wherein the one or more instructions, that cause the one or more processors to determine the optimal order for the Markov chain model, cause the one or more processors to:
  determine a first calculated lowest score order for the Markov chain model based on a first technique;
  determine a second calculated lowest score order for the Markov chain model based on a second technique;
  utilize a combination of the first technique and the second technique to determine the optimal order when the first calculated lowest score order is equivalent to the second calculated lowest score order; and
  utilize a third technique to determine the optimal order when the first calculated lowest score order is not equivalent to the second calculated lowest score order.

17. The non-transitory computer-readable medium of claim 15, wherein the one or more instructions, that cause the one or more processors to determine the model accuracy of the Markov chain model, cause the one or more processors to:
  classify the Markov chain model, based on a log odds ratio, to predict of customer conversion and customer non-conversion data;
  identify a threshold for determining a likelihood probability for conversions based on classifying the Markov chain model;
  generate a confusion matrix for model validation based on the threshold;
  compare, based on the confusion matrix, an accuracy of the optimal order of the Markov chain model with previous and subsequent orders of the Markov chain model; and
  determine the model accuracy of the Markov chain model based on comparing the accuracy of the optimal order.

18. The non-transitory computer-readable medium of claim 15, wherein the one or more instructions, that cause the one or more processors to transform the transitions in the Markov chain model, based on the optimal order and the customer data, to generate the transformed transitions, cause the one or more processors to one or more of:
  select generalized transitions, from the transitions, as the transformed transitions;
  store only transitions with non-zero values, from the transitions, as the transformed transitions;
  transform the transitions from a rectangular matrix format to a square matrix format,
    wherein the transitions in the square matrix format correspond to the transformed transitions;
  select transitions associated with customer journeys, from the transitions, as the transformed transitions; or
  select transitions less than or equal to a particular customer journey, from the transitions, as the transformed transitions.

19. The non-transitory computer-readable medium of claim 15, wherein the one or more instructions, that cause the one or more processors to utilize the linear system of equations to calculate the removal effects and the steady state values for the sparse matrices, cause the one or more processors to:
  utilize the linear system of equations to calculate the steady state values for the sparse matrices; and
  calculate the removal effects for the sparse matrices based on the steady state values for the sparse matrices.

20. The non-transitory computer-readable medium of claim 15, wherein the instructions further comprise:
  one or more instructions that, when executed by the one or more processors, cause the one or more processors to:
    measure impacts of current investments in the unique communication channels based on the attribution weights; and
    determine budgets for the unique communication channels based on the impacts.

* * * * *